(12) United States Patent
Pappas et al.

(10) Patent No.: US 7,945,472 B2
(45) Date of Patent: May 17, 2011

(54) BUSINESS MANAGEMENT TOOL

(75) Inventors: George Pappas, Centreville, VA (US); James Cannon, Deerfield, NH (US)

(73) Assignee: Optimum Outcomes, LLC, Portsmouth, NH (US)

( * ) Notice: Subject to any disclaimer, the term of this patent is extended or adjusted under 35 U.S.C. 154(b) by 1742 days.

(21) Appl. No.: 11/056,040

(22) Filed: Feb. 11, 2005

(65) Prior Publication Data
US 2006/0184414 A1     Aug. 17, 2006

(51) Int. Cl.
    *G06F 17/30*     (2006.01)
(52) U.S. Cl. .......................... 705/10; 705/11
(58) Field of Classification Search .................... 705/10, 705/11
See application file for complete search history.

(56) References Cited

U.S. PATENT DOCUMENTS

| | | | |
|---|---|---|---|
| 5,446,890 A | 8/1995 | Renslo et al. | |
| 5,461,699 A | 10/1995 | Arbabi et al. | |
| 5,712,985 A | 1/1998 | Lee et al. | |
| 5,960,415 A | 9/1999 | Williams | |
| 6,029,139 A | 2/2000 | Cunningham et al. | |
| 6,032,125 A | 2/2000 | Ando | |
| 6,067,525 A | 5/2000 | Johnson et al. | |
| 6,078,893 A | 6/2000 | Ouimet et al. | |
| 6,094,641 A | 7/2000 | Ouimet et al. | |
| 6,119,097 A | 9/2000 | Ibarra | |
| 6,173,310 B1 | 1/2001 | Yost et al. | |
| 6,205,431 B1 | 3/2001 | Willemain et al. | |
| 6,219,649 B1 | 4/2001 | Jameson | |
| 6,263,315 B1 | 7/2001 | Talluri | |
| 6,269,393 B1 | 7/2001 | Yost et al. | |
| 6,317,700 B1 | 11/2001 | Bagne | |
| 6,321,205 B1 | 11/2001 | Eder | |
| 6,393,406 B1 | 5/2002 | Eder | |
| 6,405,208 B1 | 6/2002 | Raghavan et al. | |
| 6,473,748 B1 | 10/2002 | Archer | |
| 6,539,392 B1 | 3/2003 | Rebane | |
| 6,567,796 B1 | 5/2003 | Yost et al. | |
| 6,611,726 B1 | 8/2003 | Crosswhite | |
| 6,625,577 B1 | 9/2003 | Jameson | |
| 6,665,683 B1 | 12/2003 | Meltzer | |
| 6,708,156 B1 | 3/2004 | von Gonten | |
| 6,738,736 B1 * | 5/2004 | Bond | 703/2 |
| 7,117,161 B2 * | 10/2006 | Bruce | 705/8 |
| 7,386,466 B2 * | 6/2008 | McLean et al. | 705/10 |
| 2002/0099563 A1 * | 7/2002 | Adendorff et al. | 705/1 |
| 2002/0133368 A1 * | 9/2002 | Strutt et al. | 705/1 |
| 2003/0018506 A1 * | 1/2003 | McLean et al. | 705/7 |
| 2003/0033184 A1 | 2/2003 | Benbassat et al. | |
| 2003/0074285 A1 | 4/2003 | Hoffman et al. | |
| 2004/0068431 A1 | 4/2004 | Smith et al. | |
| 2004/0243459 A1 | 12/2004 | Geritz, III et al. | |

(Continued)

*Primary Examiner* — Romain Jeanty
*Assistant Examiner* — Mark A Fleischer
(74) *Attorney, Agent, or Firm* — Pierce Atwood LLP; Kevin M. Farrell; Katherine A. Wrobel

(57) ABSTRACT

The present invention includes a business management tool that is configured to receive and process both first and second data sources for planning, performance and forecasting purposes. The business management tool of the present invention is further configured to utilize essential data including key performance indicators. The foregoing data sets are inputting into an integrated planning, performance and forecasting methodology that integrates historical data and forecasting data to form a closed loop system for managing a business. Lastly, the business management tool of the present invention is adapted to advise managers of those conditions and variables that subject the business to the most risk with regard to revenue planning and forecasting.

9 Claims, 20 Drawing Sheets

U.S. PATENT DOCUMENTS

| | | | |
|---|---|---|---|
| 2005/0065754 A1* | 3/2005 | Schaf et al. | 702/188 |
| 2005/0091156 A1* | 4/2005 | Hailwood et al. | 705/40 |
| 2005/0119861 A1* | 6/2005 | Bukary et al. | 702/186 |
| 2005/0209945 A1* | 9/2005 | Ballow et al. | 705/35 |
| 2006/0117303 A1* | 6/2006 | Gizinski | 717/136 |
| 2009/0018891 A1* | 1/2009 | Eder | 705/10 |

* cited by examiner

BUSINESS MANAGEMENT TOOL

BACKGROUND OF THE INVENTION

1. Field of the Invention

The present invention relates generally to software-based methods and tools for managing a business, and more particularly the present invention relates to a method of managing a business through integrated planning, performance and forecasting modules.

2. Scope of the Prior Art

In the current business climate, the intersection between technology and management has produced its share of both good and bad results. With the expansion of the information age and the use of computers, business managers have ready access to myriad data concerning both their operations and the conditions and performance of their industry competitors. On the other hand, access to information has lead to a number of high-profile companies becoming unraveled due to corporate malfeasance. In response to this behavior, the Sarbanes-Oxley Act was enacted in the summer of 2002 to require stricter reporting, disclosure and forecasting on behalf of large corporate entities.

The confluence of greater access to information and greater government regulations has lead to an unfortunate Catch-22 for many business managers. While there is much more data to use, how and when to process that data has become a more complex question. In short, today's business mangers, both big and small, require larger and more powerful tools to ensure the profitability of their company while simultaneously maintaining a compliant corporate culture. There is thus a need in the art for a business management tool that is configured to receive and process various data sources for planning, performance and forecasting purposes. Moreover, there is a need in the art for a business management tool that is configured to utilize essential data related to productivity, hiring and seasonality for the planning, performance and forecasting purposed noted above. Finally, there is a need in the art for a business management tool that is configured to measure and assess risk in the areas of revenue planning and forecasting. That is, there is a need in the art for a business management tool that can readily advise managers of those conditions and variables that subject the business to the most risk.

SUMMARY OF THE INVENTION

Accordingly, the present invention includes a business management tool that is configured to receive and process both first and second data sources for planning, performance and forecasting purposes. The business management tool of the present invention is further configured to utilize essential data related to productivity, hiring and seasonality for the planning, performance and forecasting purposed noted above. Lastly, the business management tool of the present invention is adapted to advise managers of those conditions and variables that subject the business to the most risk in the planning and forecasting duties.

The business management tool of the present invention is preferably embodied in a methodology executed through a software-based medium. The method includes the steps of providing a plurality of key performance indicators, such as for example quarterly seasonality and new hire productivity. The method further includes the step of providing a first set of data including data related to the business and a second set of data including data related to an industry of which the business is a part. The method further includes the step of providing an integrated management system including a planning module, a performance management module and a forecasting module.

The method of the present invention operates by inputting the plurality of key performance indicators, the first set of data and the second set of data into the integrated management system. The planning module, performance management module and forecasting module are adapted to receive selected portions of the plurality of key performance indicators, the first set of data and the second set of data for computational purposes and perform various computations and analyses thereof. In response to the predetermined outputs from the various computations and analyses, a user can better manage the planning, performance and forecasting aspects of the business. As briefly described therefore, the present invention provides a manager with an integrated methodology for making informed decisions and accurate predictions concerning the business. Further advantages and details of the present invention are fully described herein in its preferred embodiments with reference to the following drawings.

DETAILED DESCRIPTION OF THE PREFERRED EMBODIMENTS

As described further below the present invention provides a tool for integrating the planning, performance and forecasting aspects of business management into a single methodology for use by a business manager. In particular, the business management tool of the present invention utilizes a discrete set of variables as inputs for rendering a series of outputs through which a business manager make decisions regarding his or her sales force. The business management tool of the present invention is embodied in a methodology that is preferably operable in a software-based medium. Advantageously, integration of the method of the present invention into a computational system provides a user with sufficient computational power and storage capacity to effectively manage the data processing and statistical power of the present invention. These and various other aspects of the present invention as described further below.

Figure 1A:
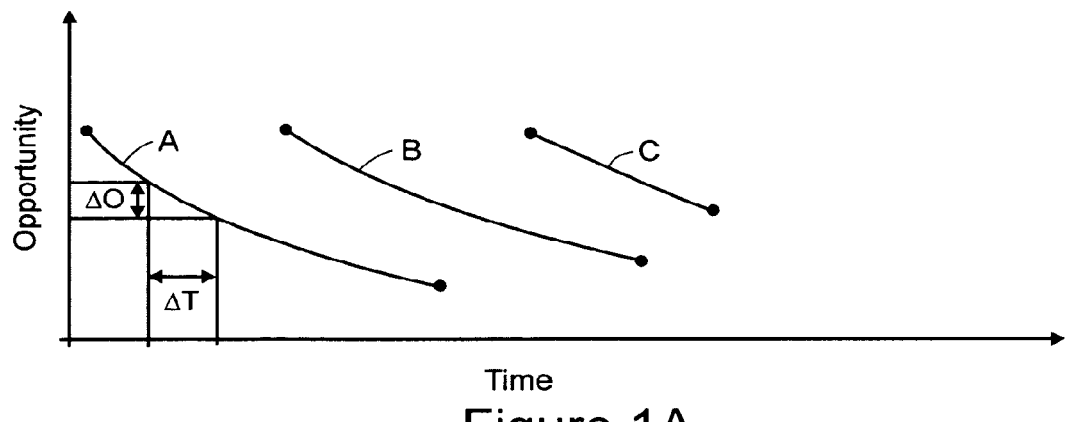
FIG. 1A is a graphical representation showing the relationship between business opportunities and time for a number of sales resources.

FIG. 1A is a graphical representation showing the relationship between business opportunities and time for a number of sales resources, designated A, B and C. A sales resource is one of a sales representative or a channel resource, such as direct mail, Internet or some other form of directed advertising and selling of a product. The vertical axis is a measure of opportunities, wherein the term "opportunities" will refer to a sales opportunity that a sales representative or channel resource has at any given time. The horizontal axis is a measure of time.

As shown in FIG. 1A, for each sales resource A, B and C, for any change in time $\Delta T$ there is a decline in the number of opportunities shown as $\Delta O$. This general curve or sloped relationship is known as a sales pipeline or sales process. For example, if A represents a sales representative engaged by a business to sell a product or service, then at one point in the sales process A will have a number of contacts, leads, or other opportunities to close the deal. As time passes, the number of opportunities will decrease until at the end of the sales process, A will close a deal with one or more customers. The ratio of closed sales to original opportunities during any sales process is referred to as the yield, which is preferably measured by steps in the sales process. The overall time between steps in the sales process or the rate at which A moves through his or her opportunities is defined as the flow.

Figure 1B:
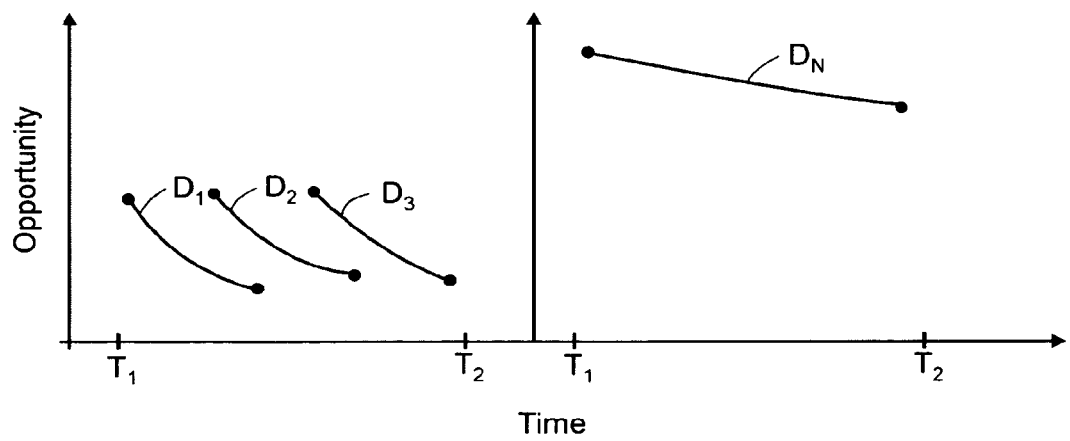
FIG. 1B is a split graphical representation showing the relationship between business opportunities and time for a single sales resource.

Of course, sales resources do not maintain discrete sales processes for selling any particular product. Rather, during any period the numbers of opportunities is constantly being replenished as deals close or drop out of the pipeline. This aspect of the business is shown in FIG. 1B where the reference D is a single sales resource and the numerical subscripts represent different individual pipelines 1, 2 and 3. Thus, for any sales resource D, the discrete sales pipelines can be aggregated into a single pipeline represented by $D_N$ that also shows a general declination over time.

The purpose of the present invention is to accurately measure, analyze and predict the shape of the curve represented by $D_N$ over the life of a business. More preferably, business managers can best utilize the present invention to reduce the slope of the sales pipeline by increasing the yield of sales from current and future sales opportunities and by more accurately forecasting the number of opportunities needed by any sales resource at any time to ensure proper growth and profitability. The detailed methodology by which the present invention accomplishes this goal is set forth below.

Figure 2:
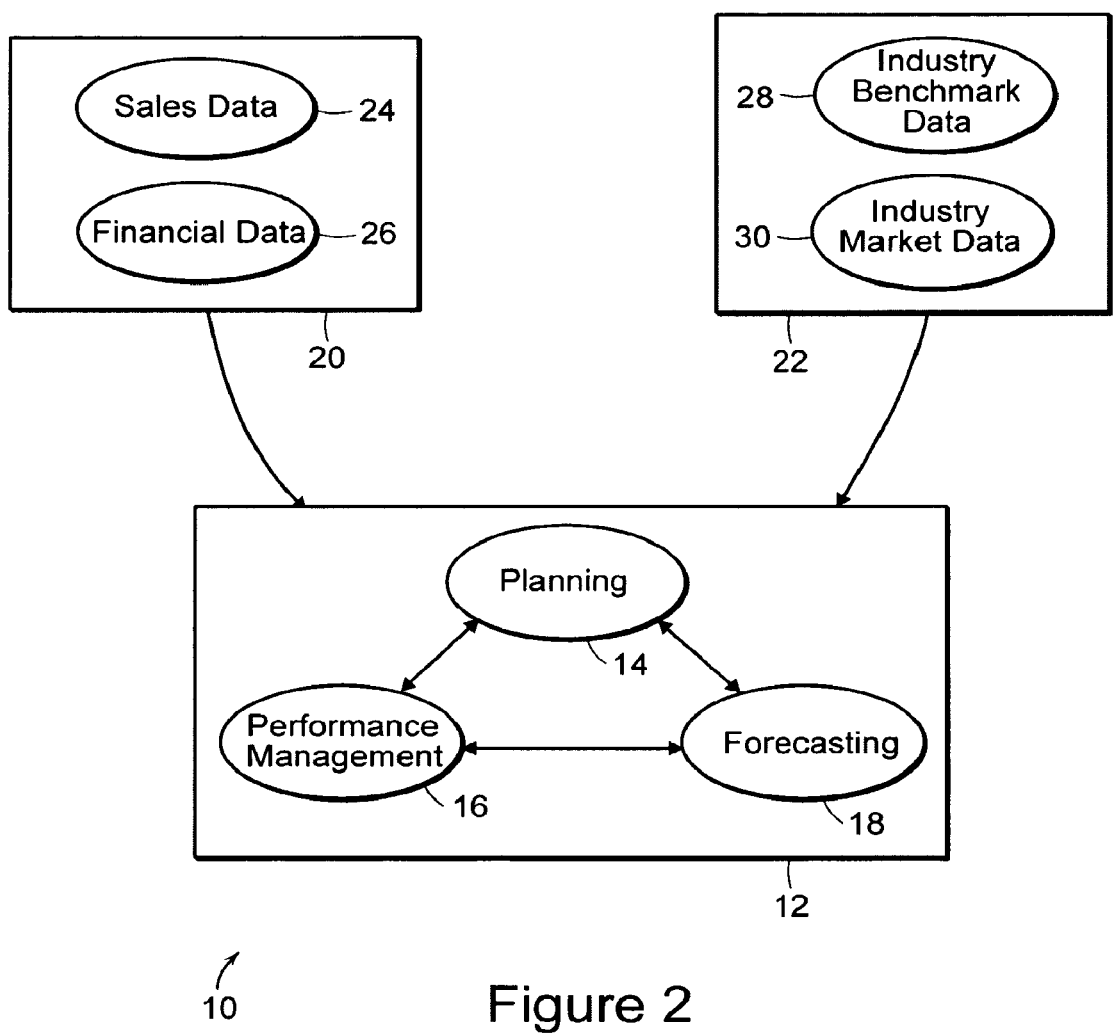
FIG. 2 is a schematic block diagram of the methodology of the present invention.

FIG. 2 is a schematic block diagram of the methodology of the present invention. The business management system 10 of the present invention generally includes an integrated subsystem 12 having a planning node 14, a performance management node 16 and a forecasting node 18. The integrated subsystem 12 operates in response to data derived from a first data source 20 and a second data source 22. The first data source 20 includes a sales data 24 component and a financial data 26 component. The second data source 22 includes an industry benchmark data 28 component and an industry market data 30 component.

Of particular note is that the industry benchmark data 28 and the industry market data 30 are at least partially comprised of anonymous data supplied by each business that utilizes the business management tool of the present invention. Through anonymous submission, each user can submit his or her company's data into the industry benchmark data 28 and industry market data 30 pool for viewing and analysis by the remaining users of the present invention. In such a manner, the present invention supplies its users with comparative data from within its industry competitors thus allowing each company to further develop and improve its own business practices. Moreover, the anonymous nature of the submissions that form the industry benchmark data 28 and industry market data 30 will not jeopardize the individual business practices of any participating business.

Figure 3:
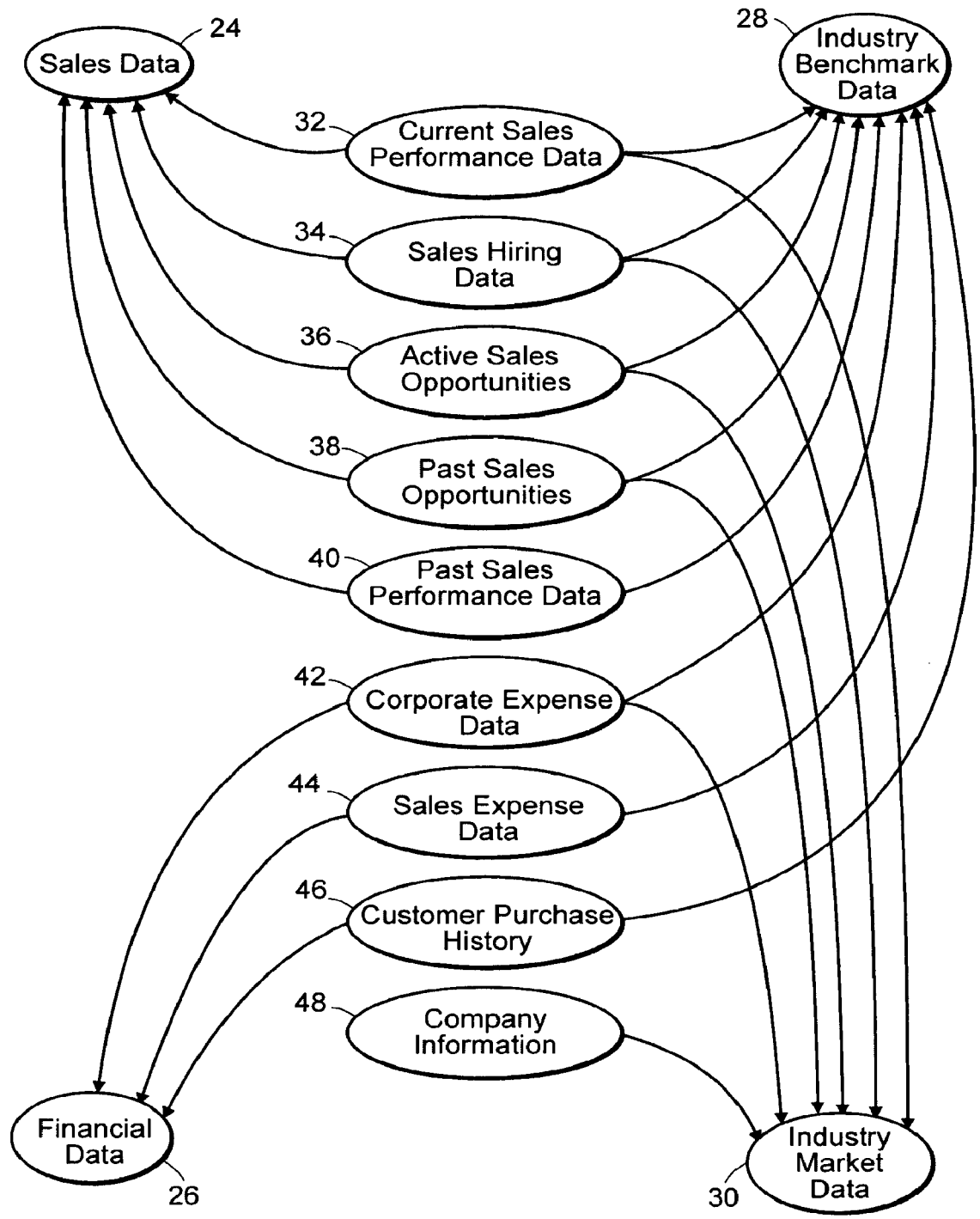
FIG. 3 is a schematic block diagram of a group of data sets utilized by the present invention.

FIG. 3 is a schematic block diagram of a group of data sets utilized by the present invention. As shown, the sales data 24 is a composite of several data sources including a current sales performance data 32, a sales hiring data 34, an active sales opportunities data 36, a past sales opportunities data 38 and a past sales performance data 40. The financial data 26 is a composite of a corporate expense data 42, a sales expense data 44 and a customer purchase history data 46. Together, the sales data 24 and financial data 26 form the first data source 20 that is inputted into the integrated subsystem 12.

The industry benchmark data 28 is a composite of the current sales performance data 32, the sales hiring data 34, the active sales opportunities data 36, the past sales opportunities data 38, the past sales performance data 40, the corporate expense data 42, the sales expense data 44 and the customer purchase history data 46. As previously noted, these data sources are provided to the users of the present invention on an anonymous basis such that each user can make comparative analyses of its business practices as compared to the industry as a whole.

The industry market data 30 is a composite of the current sales performance data 32, the sales hiring data 34, the active sales opportunities data 36, the past sales opportunities data 38, the past sales performance data 40, the corporate expense data 42 and a company information data 48, which is currently available information concerning companies in the industry. As previously noted, the industry market data 30 is also a composite based in part on anonymous submissions of the users of the present invention, with the exception of the company information data 48, which is presumed to be publicly available.

Figure 4:
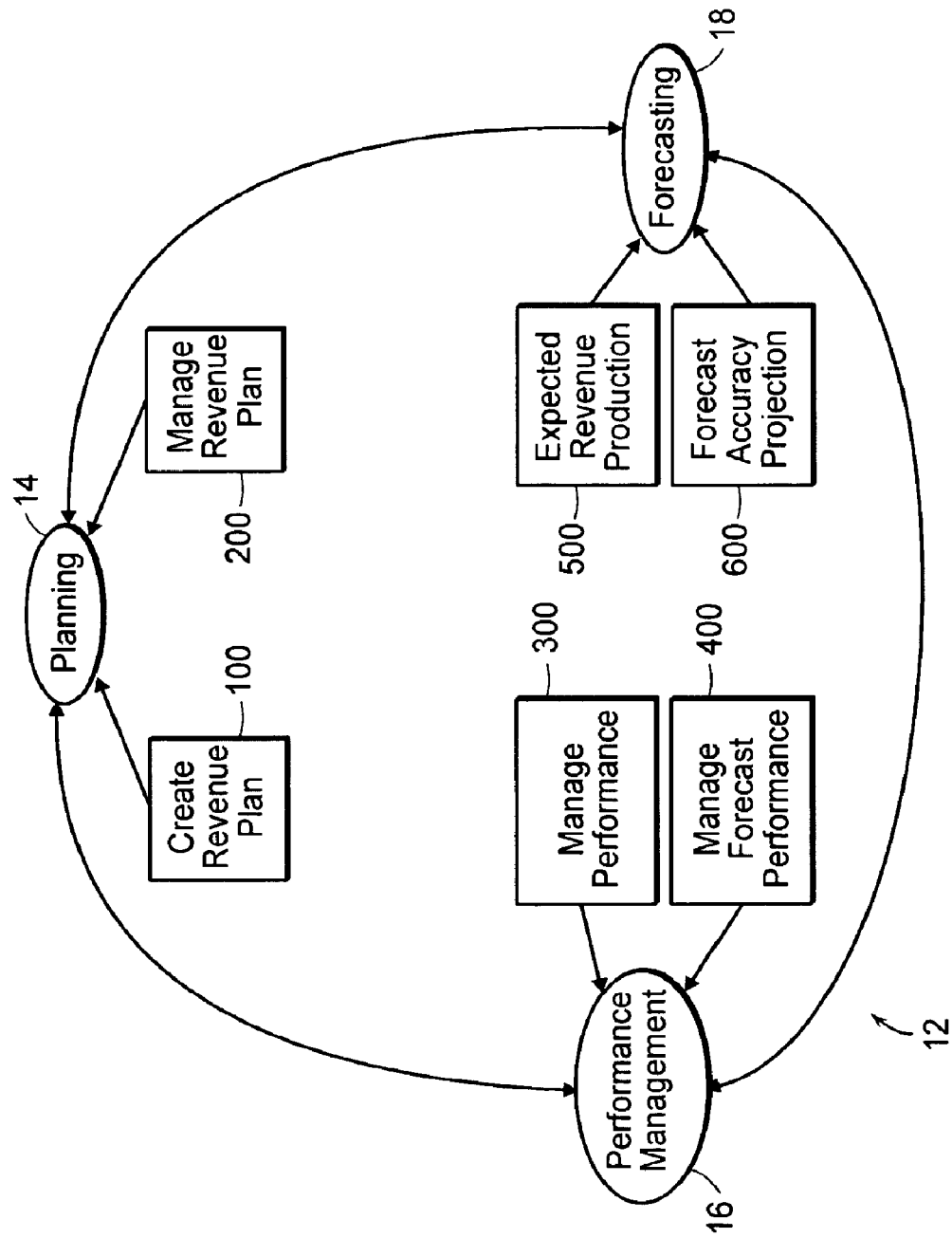
FIG. 4 is a schematic block diagram of the integration of the present invention.

FIG. 4 is a schematic block diagram of the integrated subsystem 12 of the present invention. As shown, the planning node 14 of the subsystem 12 includes two routines defined as the create revenue plan routine 100 and the manage revenue plan routine 200. Similarly, the performance management node 16 includes a manage performance routine 300 and a manage forecast performance routine 400. The forecasting node 18 includes an expected revenue production routine 500 and a forecast accuracy projection routine 600. Each of the foregoing routines is designed to implement a specific method, preferably in a software-based medium, for processing the data sets described above.

Figure 5:
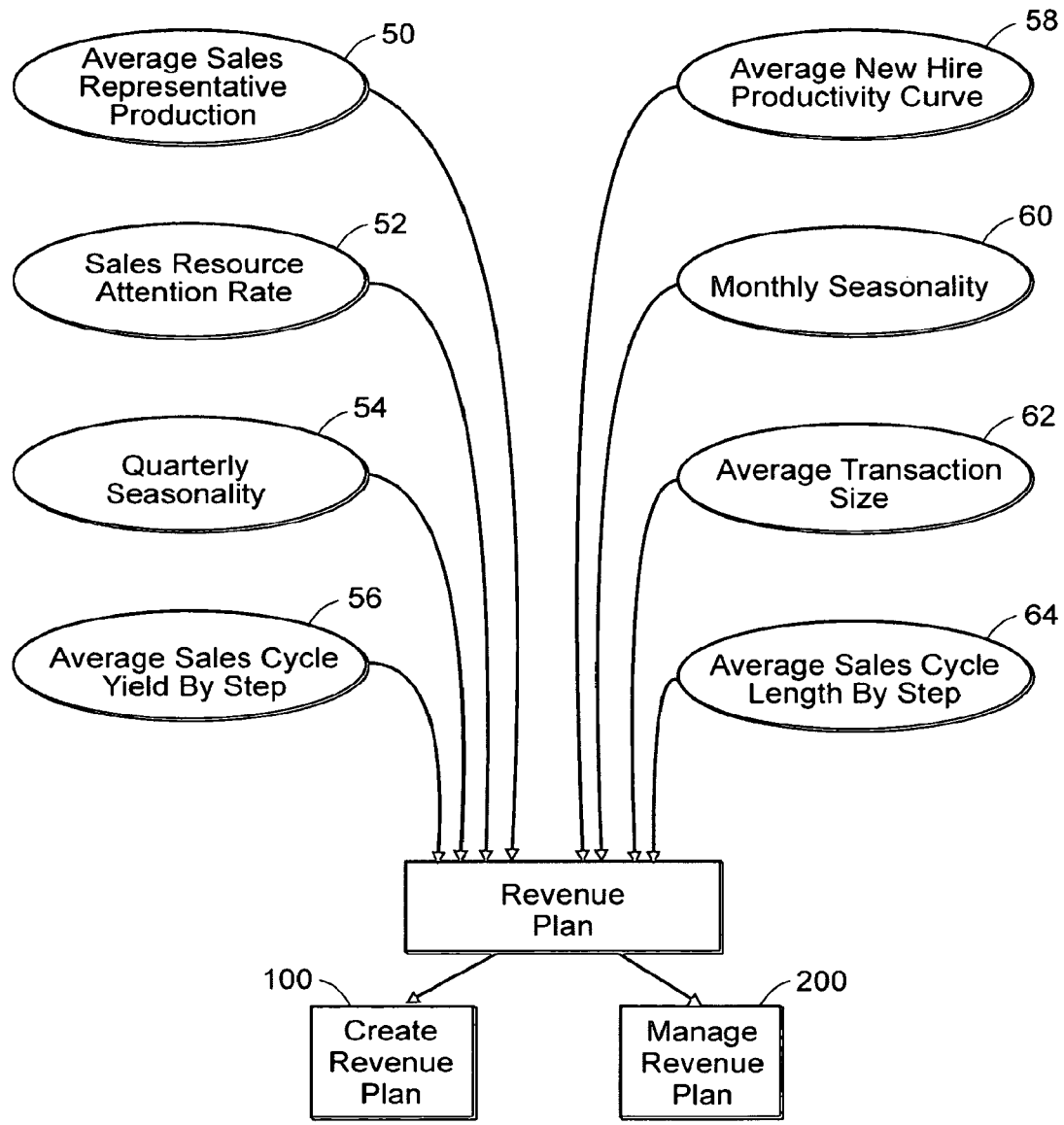
FIG. 5 is a schematic block diagram of a group of key performance indicators utilized by the present invention.

FIG. 5 is a schematic block diagram of a group of key performance indicators (KPI) utilized in addition to the data sets described above for improving the management of a business. The key performance indicators include an average sales representative production 50, a sales resource attrition rate 52, a quarterly seasonality 54, an average sales cycle yield by step 56, an average new hire productivity curve 58, a monthly seasonality 60, an average transaction size 62 and an average sales cycle length by step 64. The sales resource attrition rate 52 includes data related to the attrition of both sales representatives and channel partners, and thus incorporates all potential lost revenue for each revenue source used by the business.

As shown, the KPI are inputted into the routines described above, for example the create revenue plan routine 100 and the manage revenue plan routine 200. In general, the KPI are specific to the company and industry utilizing the present invention, and serve to better describe the performance and output of each sales resource employed by the business. Moreover, as the KPI include data related to turnover, new hiring and seasonality they are particularly useful in the management and forecasting functions of the present invention.

Figure 6:
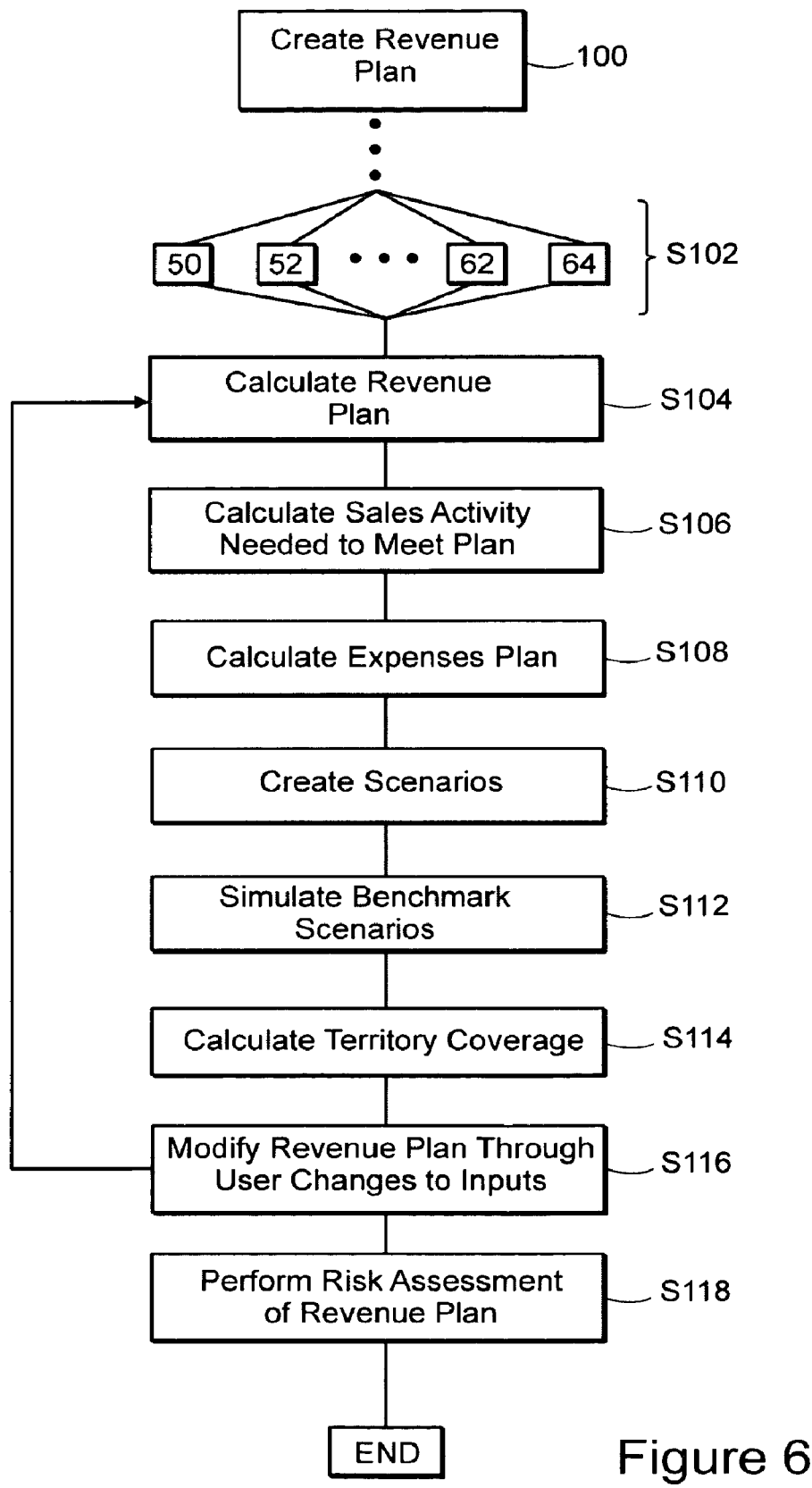
FIG. 6 is a flow chart depicting a method of creating a revenue plan in accordance with the present invention.

FIG. 6 is a flow chart depicting the methodology embedded in the create revenue plan routine 100 in accordance with the present invention. In step S102, at least one of the eight KPI described above is inputted into the routine. Preferably, all eight KPI are utilized in the create revenue plan routine 100. At step S104, a revenue plan is calculated following calculations that are described further herein with reference to FIG. 7. In step S106, the method calculates the volume or amount of sales activity needed to meet the revenue plan, i.e. raw number of sales opportunities that are required to meet the calculated revenue plan. In step S108, an expense plan is calculated using first data related to expenses. In step S110, the method creates a group of alternate scenarios that change the revenue plan, expense plan and other outputs by varying the various inputs. In step S112, the method simulates benchmark scenarios by utilizing the second data related to industry standards. In step S114, the method determines a territory coverage that establishes geographical parameters for properly calculating the revenue plan. In step S116, a user is permitted to modify the previously estimated revenue plan through user changes to the inputs, a process that results in the method beginning from step S104 and recalculating the aforementioned parameters. In step S118 of the method, a risk assessment of the revenue plan is performed as described in greater detail below.

Figure 7:
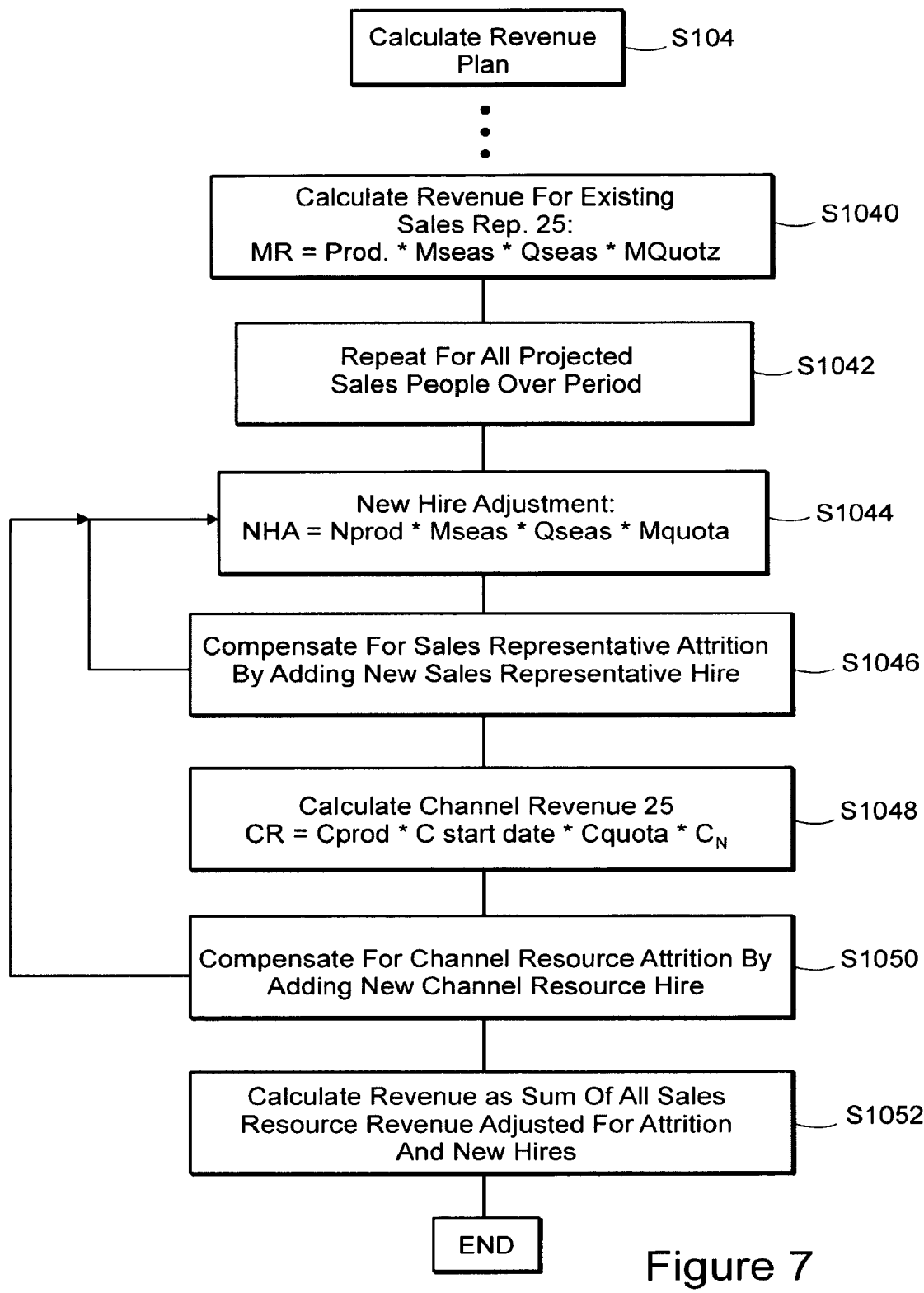
FIG. 7 is a flow chart depicting a method of calculating a revenue plan in accordance with the present invention.

FIG. 7 is a flow chart depicting the steps of calculating the revenue plan shown as S104 in FIG. 6. In step S1040, the monthly revenue (MR) is calculated for existing sales representatives as a function relating to productivity (Prod), monthly and quarterly seasonality (MSeas and QSeas) and monthly sales quotas (MQuota). That is, $$MR=Prod*MSeas*QSeas*MQuota.$$

In step S1042, the foregoing calculation is repeated for all sales representatives over a time period determined by the user, for example for an upcoming quarter.

In step S1044, the method adjusts the revenue calculation for newly hired sales representatives and channel resources. The new hire adjustment (NHA) is:

$$NHA=NProd*MSeas*QSeas*MQuota,$$

where Nprod is a measure of new hire productivity, the value of which depends on whether the new hire is a sales representative or a channel resource.

The NHA calculation is needed to adjust the revenue calculation for each sales representative that leaves the business sales force during the period under examination. As shown in step S1046, each sales representative that is lost or is anticipated to be lost during a certain time period is compensated for by an attrition adjustment, which assumes that a new hire is brought into the sales force upon the departure of each sales representative. Accordingly, the attrition adjustment of step S1046 loops back to the NHA described in step S1044.

The method of the present invention also accounts for channel resources that are often employed by today's businesses. Broadly defined, a channel resource is a method or means of selling a product or service that is not a sales representative per se, but nevertheless is expected to generate a certain amount of sales on behalf of the company. As shown in step S1048, the channel revenue (CR) is the product of the channel productivity (CProd), the channel start date relative to the measurement period (C start date), the sales quota of the channel resource (CQuota) and the number of channel resources ($C_n$).

As noted with respect to sales representatives, it can be expected that some number of channel resources will break service with the business during the time period in question. Thus, as before, the method of the present invention includes step S1050 that compensates for the attrition of channel resources by adding a new channel resource hire. As before, this compensation step requires that the method return to step S1044 and compute a NHA value for each channel resource that is projected to be lost over the coming revenue plan period.

Given the foregoing determinations, the revenue plan is calculated in step S1052 as the channel revenue added to the monthly revenue expected from the sales representatives. Each of these values is adjusted by the value of the NHA for the expected new hires as well as the attrition adjustment attributable to both the departing sales representatives and the departing channel resources. As previously noted, this method is employed to calculate the revenue plan according to step S104 of the create revenue plan routine 100.

Figure 8:
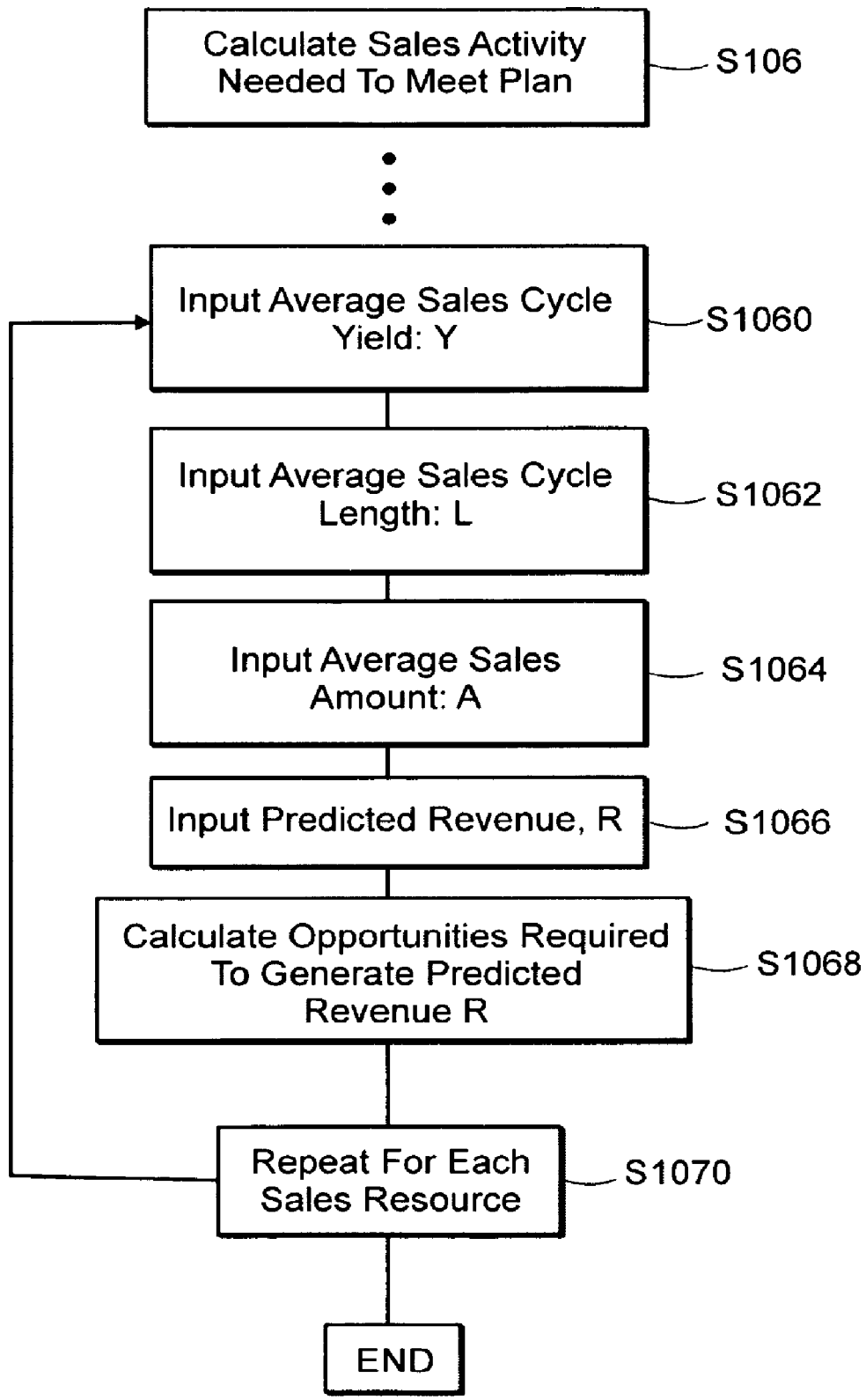
FIG. 8 is a flow chart depicting a method of calculating the sales activity needed to meet a revenue plan in accordance with the present invention.
Figure 9:
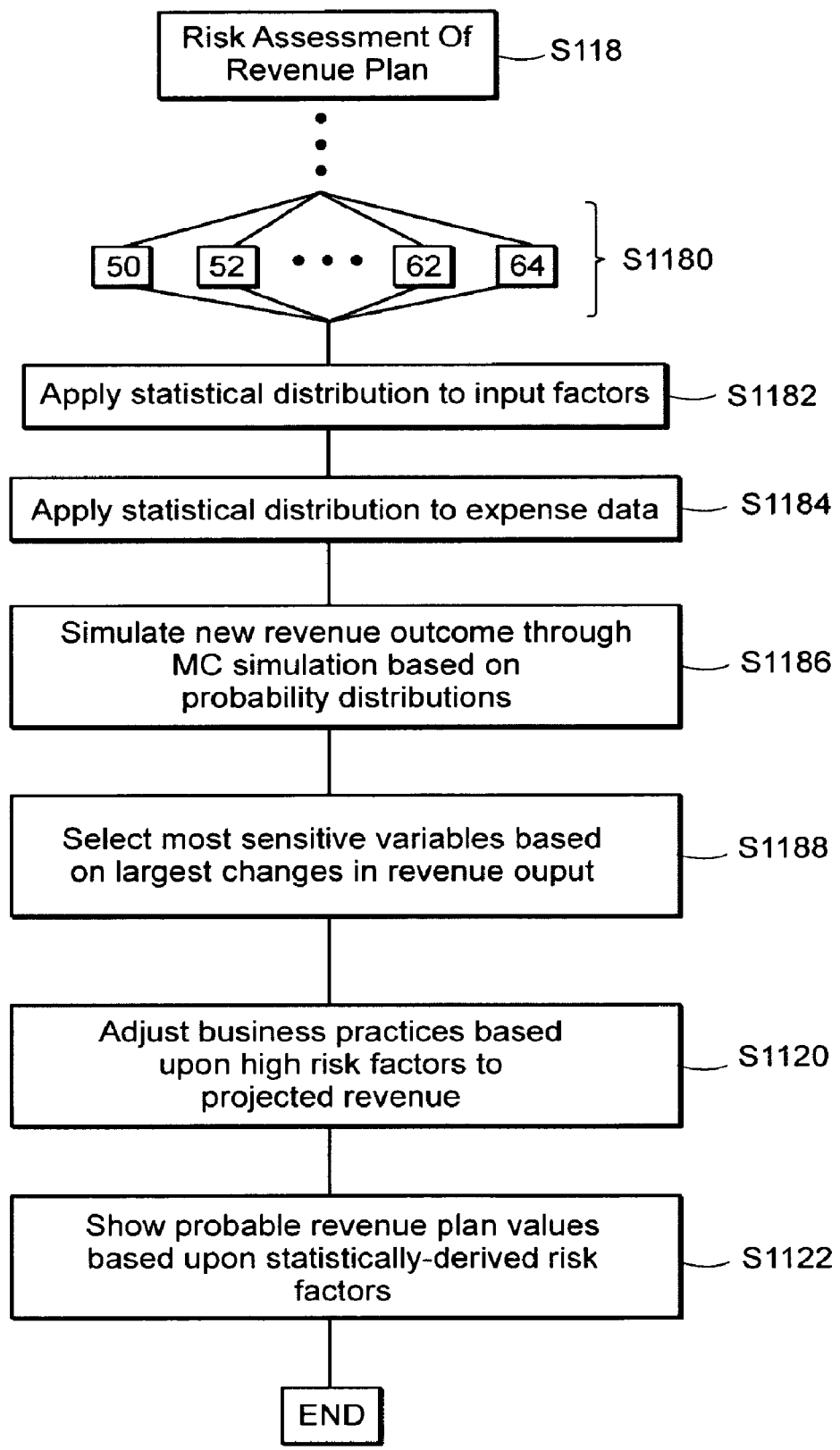
FIG. 9 is a flow chart depicting a method of assessing the risk associated with a revenue plan in accordance with the present invention.

FIG. 8 is a flow chart depicting a method of calculating the sales activity needed to meet a revenue plan in accordance with step S106 of the create revenue plan routine 100. As shown, the sales activity needed to meet the revenue plan is calculated through calculations related to a group of the KPI described above. In step S1060, the method inputs the average sales cycle yield, Y. In step S1062, the method inputs the average sales cycle length, L. In step S1064, the method inputs the average sales amount, A. In step S1066, the method inputs the predicted revenue, R, as calculated in step S1050 and described above. Given the foregoing inputs, the method can arithmetically determine the number of opportunities required to generate the projected revenue, R, as shown in step S1068. In step S1070, the method described above is repeated for each sales resource, including both sales representatives and channel resources.

The create revenue plan routine 100 includes a step that assesses the risks associated with the creation of the revenue plan as well as projecting a most probable value for the revenue plan based upon statistical analysis. As shown in FIG.

9, the plurality of KPI inputs is inputted into the method at step S1180. In step S1182 a statistical distribution is applied to numerical values that comprise the KPI inputs, thus giving a range of input values for each of the KPI values. Similarly, in step S1184, a statistical distribution is applied to the expense data determined before in step S108 of the create revenue plan routine 100. In step S1186, the method utilizes a Monte Carlo or other suitable statistical simulation algorithm to simulate a new revenue value based upon the probability distributions determined for the KPI values and the expense data.

Once the simulation is complete, the method in step S1188 selects the most sensitive variables as those that embody a significant risk for the business. For example, if the statistical distribution about the average sales cycle length 64 results in a large variation in the simulated revenue, then the present invention will inform the user that this factor needs to be carefully monitored and managed to prevent unnecessary risk. In step S1120, the method of the present invention will preferably inform the user of this risk such that the user can make the appropriate adjustments to his or her management strategy in order to reduce the risk to the business. Moreover, in step S1122, the method of the present invention shows the user the most probable revenue plan values based upon the foregoing analysis of the statistically significant risk factors. Alternatively, the present method will also permit a user to project a revenue value by inputting a selected probability, i.e. in order to determine what revenue will be generated with 75% certainty.

Figure 10:
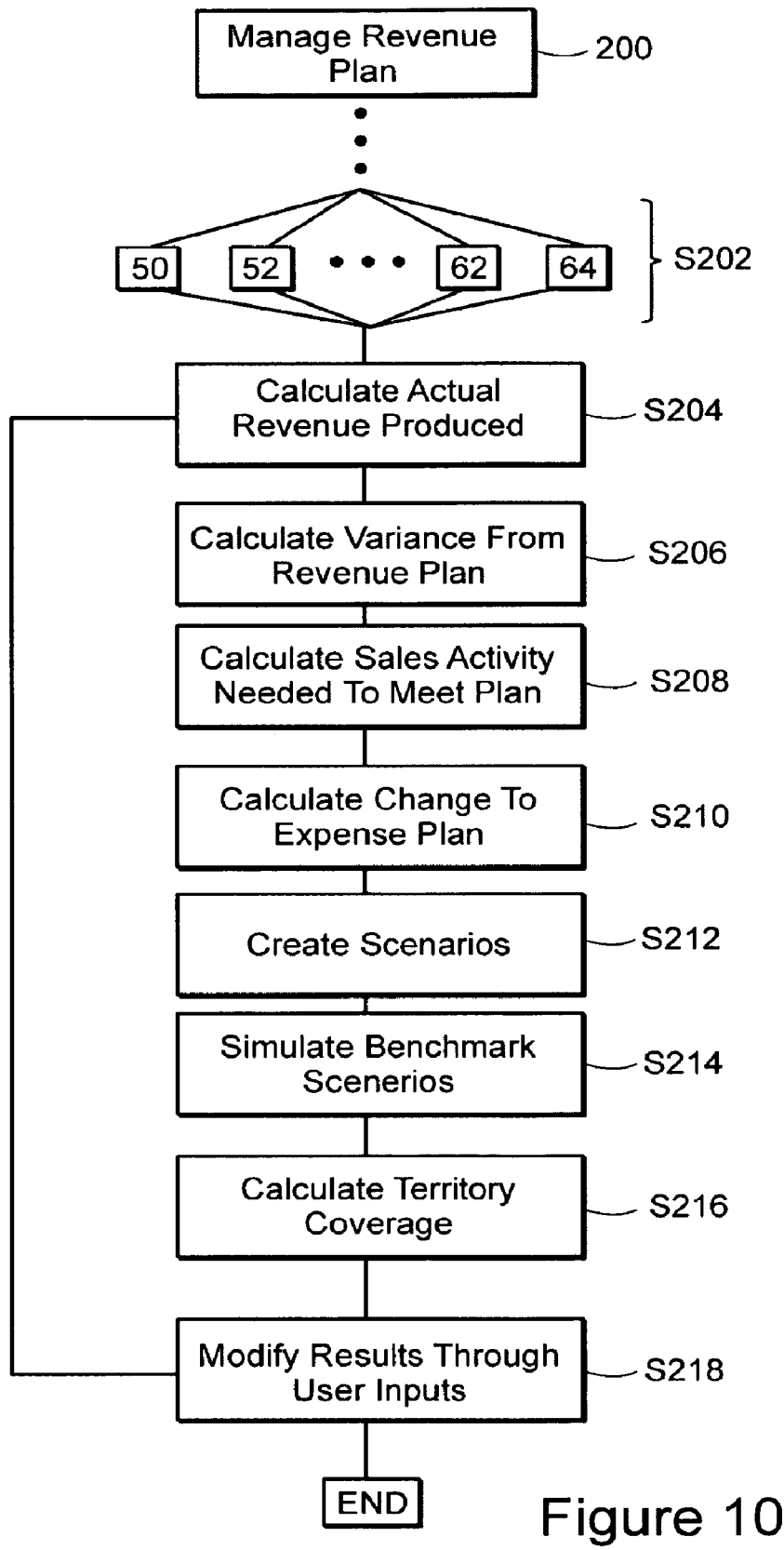
FIG. 10 is a flow chart depicting a method of managing a revenue plan in accordance with the present invention.

The manage revenue plan routine 200 is shown in detail in FIG. 10. A manager will preferably use the manage revenue routine 200 to determine the variance between the actual and projected revenues of the business. Furthermore, the manage revenue routine 200 is adapted to create alternate scenarios in which the variance is altered through changes to the input variables. Thus, a manager can effectively track and make adjustments to the revenue plan and the current business practices in order to ensure a healthy and profitable revenue stream.

As shown, the plurality of KPI variables is inputted into the method at step S202. In step S204, the method calculates the actual revenue produced by the business. In step S206, the method calculates the variance between the actual revenue produced by the business and the revenue projected under the create revenue plan routine 100. In step S208, the method calculates the volume or amount of sales activity needed to meet the revenue plan, i.e. raw number of sales opportunities that are required to meet the calculated revenue plan. In step S210, changes to the expense plan are calculated using first data related to expenses. In step S212, the method creates a group of alternate scenarios that change the revenue plan, expense plan and other outputs by varying selected inputs. In step S214, the method simulates benchmark scenarios by utilizing the second data related to industry standards. In step S216, the method determines a territory coverage that establishes geographical parameters for properly calculating the revenue plan. In step S218, a user is permitted to modify the results calculated by the method by varying the inputs, a process that results in the method beginning from step S204 and recalculating the aforementioned parameters.

Figure 11:
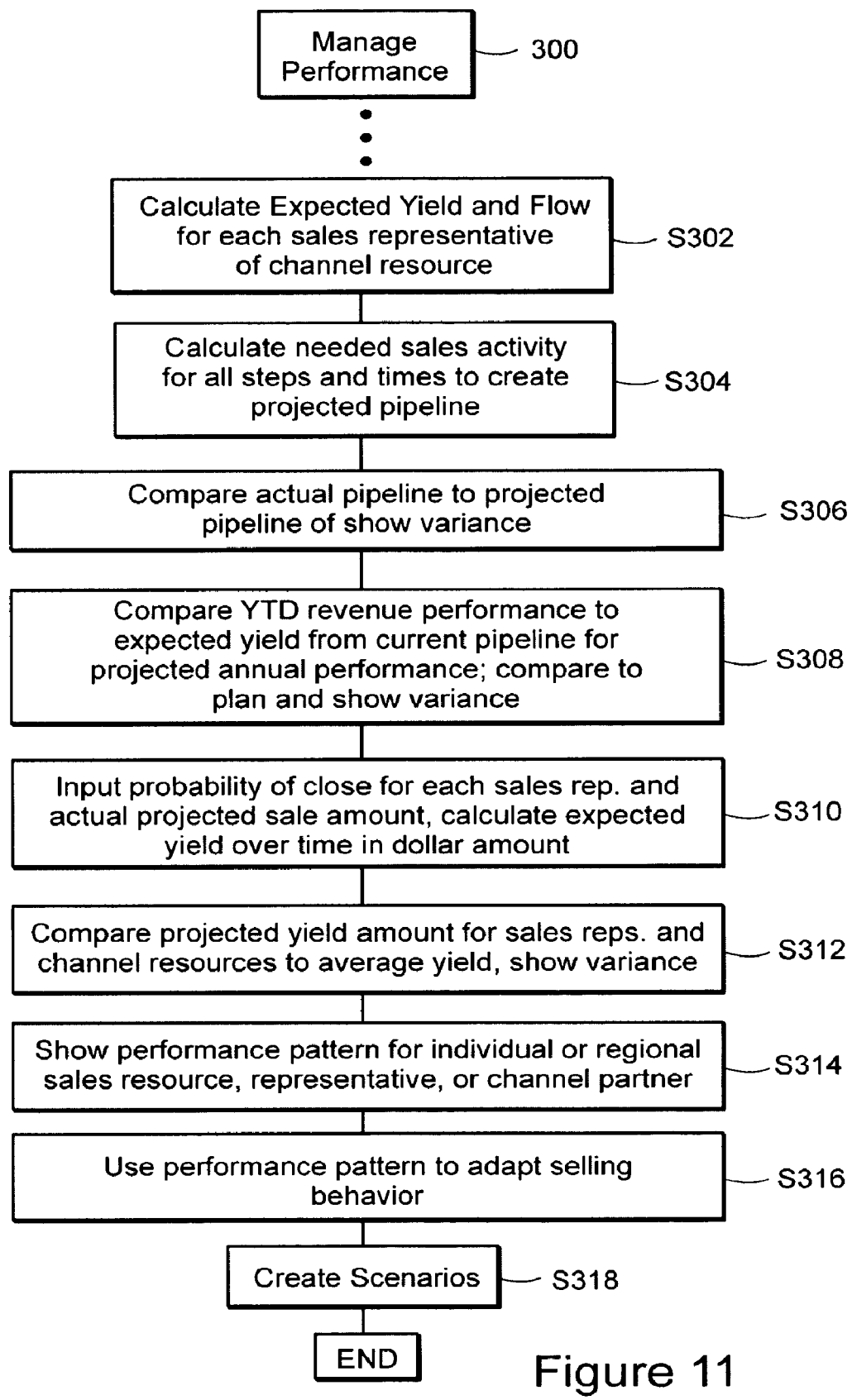
FIG. 11 is a flow chart depicting a method of managing performance in accordance with the present invention.

The manage performance routine 300 is shown in greater detail in FIG. 11. In step S302, the method calculates the actual yield and flow for each sales representative and channel resource. As noted above, the yield is defined as the ratio of closed sales to original opportunities during any sales process, or more preferably as the ration of closed sales to original opportunities by step in the sales process. The flow is defined as the rate at which the sales resources move between steps in a sales cycle. The calculations of step S302 are discussed further with reference to FIG. 12.

In step S304, the method calculates the needed sales activity for each step in the sales process and at all times during the sales process to create a projected pipeline. That is, the method determines the raw number of sales opportunities required to met the revenue plan given the actual yield and flow calculated above. In step S306, the method compares the actual sales pipeline to the projected sales pipeline, the latter of which is based upon projected values for yield and flow.

In step S308, the method compares the year-to-date (YTD) revenue performance to the expected yield from the current pipeline in order to project the annual performance of the business. In other words, the method adds the actual YTD revenues with those projected by the anticipated yield in order to arrive at a projected revenue value. That value is compared to the revenue plan calculated in the create revenue plan routine 100 and the variances are shown to the user.

In step S310, the method inputs a probability of close for each sales opportunity in the pipeline, i.e. the statistical odds that any one opportunity will end in a closed deal or sale. This probability is multiplied by the projected sales amount, and then given the overall pipeline yield the method can calculate a projected yield amount in dollars. In step S312, the method compares the projected yield amount to the actual average yields for each sales representative and channel resource and calculates the variances.

In step S314, the method displays a performance pattern for one or more sales resources, as defined by type or territory. The performance pattern is the relationship between the actual and projected yield for any sales resource. For example, the performance pattern may be for all channel partners in the Northeast region of the United States, or alternatively for an individual sales representative in California. Using the performance patterns, the method of the present invention supplies a user with the information needed to adapt the selling behavior of one or more sales resources as shown in step. S316. In step S318, the method creates a range of scenarios that allow a user to see variations in performance patterns, as further described in FIG. 13.

Figure 12:
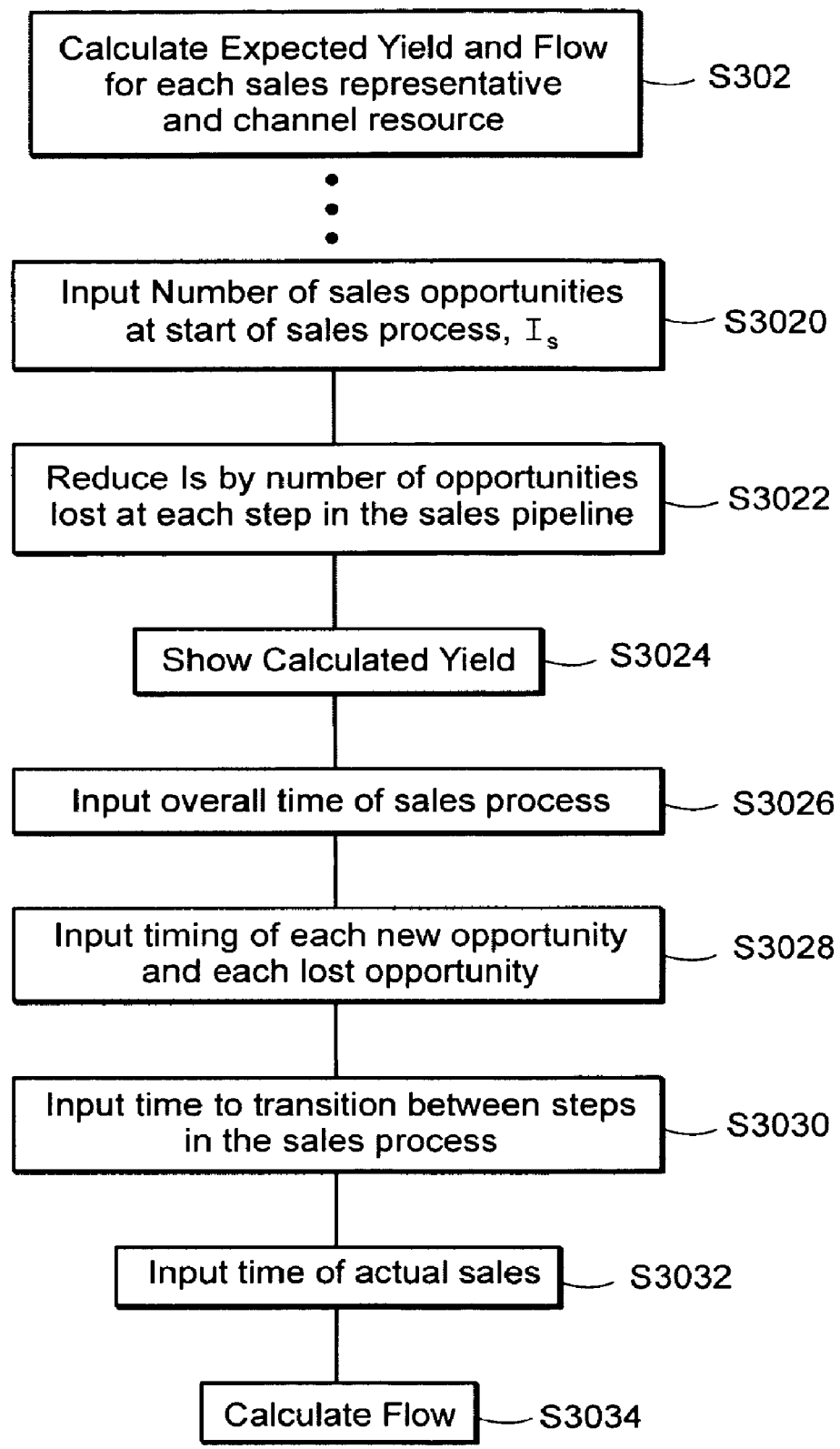
FIG. 12 is a flow chart depicting a method of managing performance by flow and yield in accordance with the present invention.

FIG. 12 is a flow chart detailing the calculations of actual flow and yield generally shown as step S302 above. In step S3020 the method inputs the number of sales opportunities at the beginning of a sales process or pipeline, $I_S$. In step S3022 the number $I_S$ is reduced by the number of opportunities at each step in the sales pipeline. The remaining number of opportunities will give the actual yield by step in the sales cycle, determined in step S3024.

In step S3026, the overall time length of the sales process or pipeline is inputted into the method. At step S3028, the timing of each new opportunity and each lost opportunity is inputted into the method. The time to transition between steps in the sales process is inputted at step S3030; and the times of the actual sales are inputted at step S3032. Given the foregoing inputs, the method calculates the actual flow as well as the rate of opportunity loss or deal closure, at step S3034.

Figure 13:
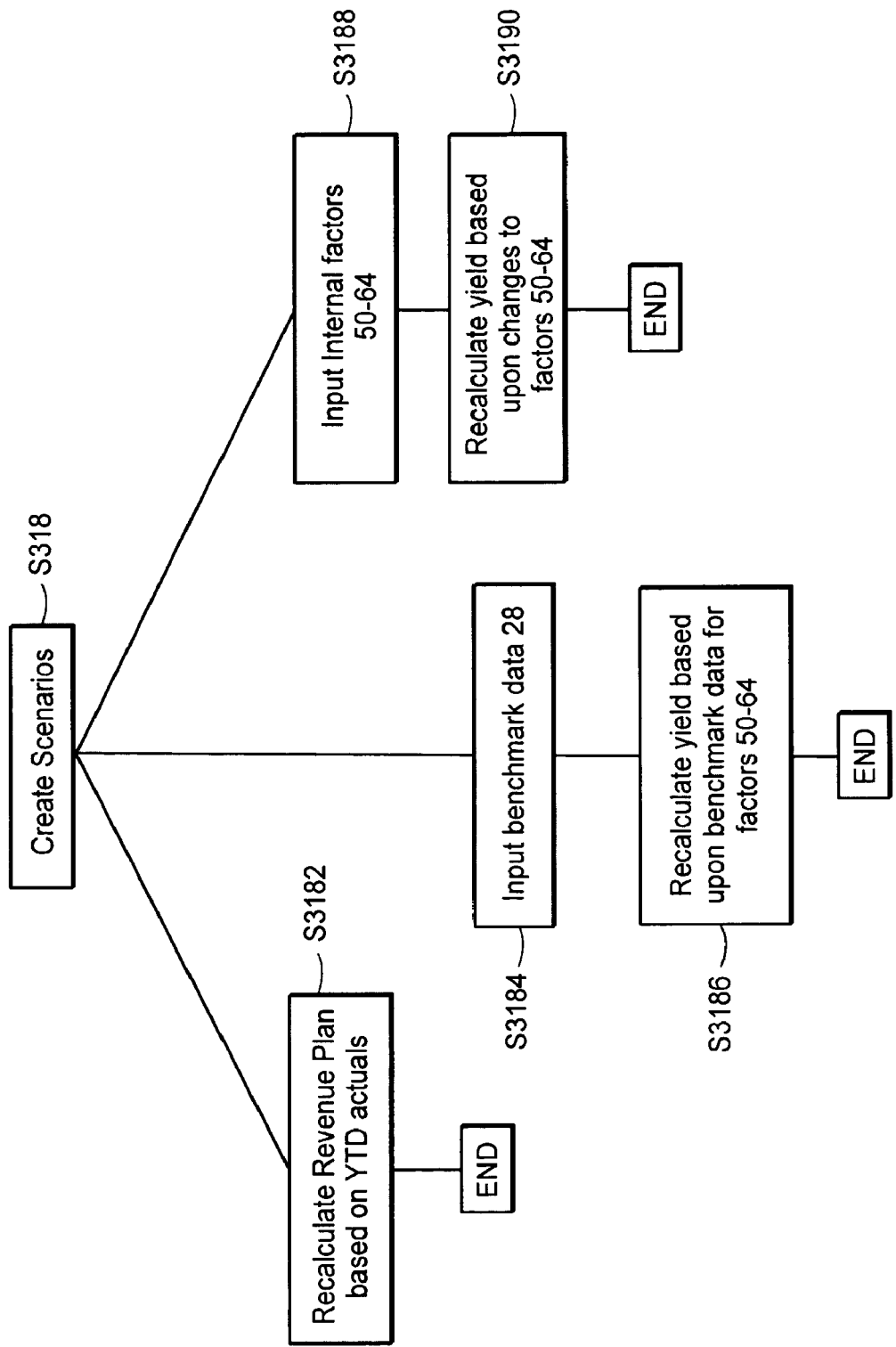
FIG. 13 is a flow chart depicting a method of managing performance through the creation of scenarios in accordance with the present invention.

As noted above, the manage performance routine 300 includes a step for creating scenarios at S318. This step in the routine is illustrated in FIG. 13. As shown, the scenario creation of step S318 involves a group of options for the user. In a first option, the revenue plan is recalculated based upon the YTD values for each of the input variables relevant to the create revenue routine 100 at step S3182. At step S3184, the user inputs the industry benchmark data 28 described above and then recalculates the yield based upon benchmark data for the plurality of KPI at step S3186. In step S3188, the user inputs variations to the KPI factors and then the yield is recalculated based upon changes to these KPI factors at step S3190.

Figure 14:
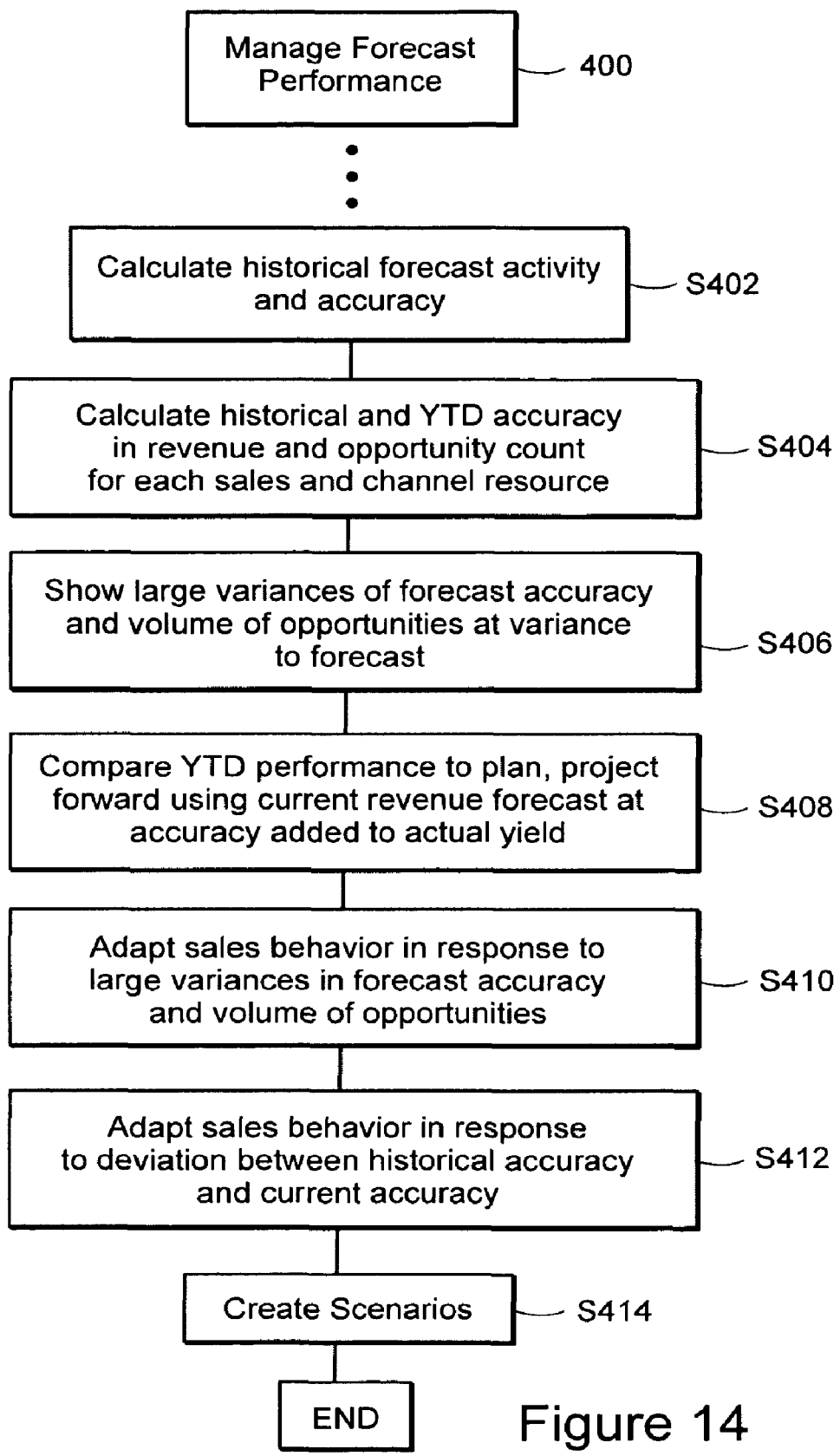
FIG. 14 is a flow chart depicting a method of managing forecast performance in accordance with the present invention.

FIG. 14 is a flow chart depicting a method associated with the manage forecast performance routine 400 of the present invention. This particular routine involves the analysis and management of the predictive accuracy of the business, including the accuracy of projections made by the sales resources regarding opportunities and yield. In step S402, the method calculates the historical forecast activity and accuracy, as further described with reference to FIG. 15. In step S404, the method calculates the historical and YTD accuracy in revenue and opportunity account for each sales representative and channel resource. In step S406, large variances in the forecast accuracy and forecast volume of opportunities are shown to the user.

In step S408, the method compares the YTD performance of the business is compared to the revenue plan and the revenue projections are revised using the current revenue forecast and accuracy added to the actual YTD yield. In response to the large variances in the forecast accuracy and volume of opportunities, the user can adapt his or her sales forecast and behavior in step S410 to rectify any glaring overestimates with regard to forecast numbers. Furthermore, in step S412 the method notifies the user of any deviations between the historical and current forecast accuracies, in response to which the manager may wish to adapt his or her sales behavior. Finally, in step S414, the user is permitted to create scenarios for determining alternative outputs from this routine.

Figure 15:
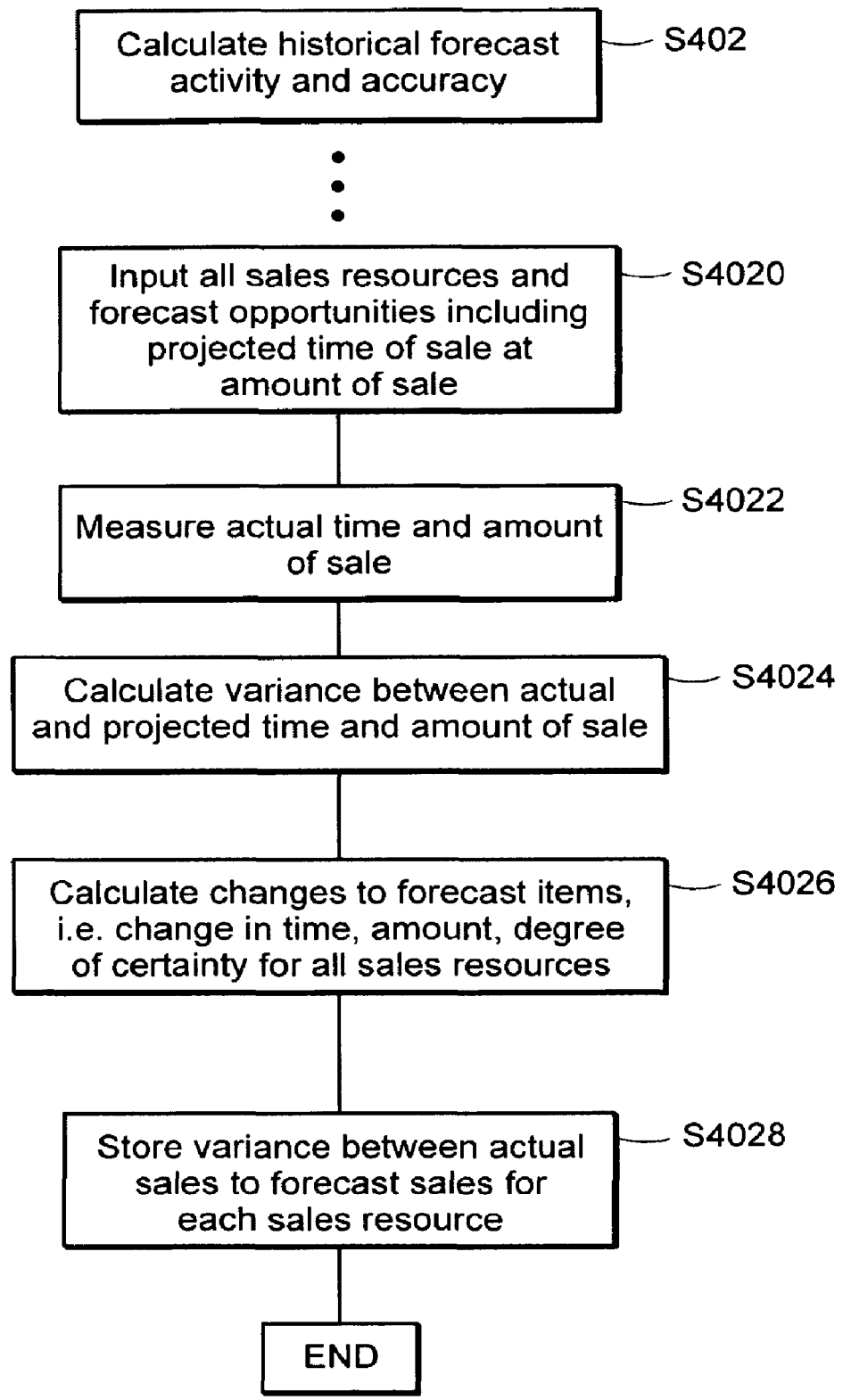
FIG. 15 is a flow chart depicting a method of managing forecast performance through historical analysis in accordance with the present invention.

As noted, FIG. 15 is a flow chart depicting the method of calculating the historical forecast activity and accuracy. In step S4020, the method inputs, for each sales resource, all forecast opportunities including the projected time and amount of sale. In step S4022, the method determines the actual time and amount of each sale previously forecast in step S4020. In step S4024, the method calculates the variance in time and amount between the projected and actual sales. In step S4026, the method calculates the factors determining the variance previously determined, i.e. the change in time of sale, change in amount of sale, and change in degree of certainty of sale. The method at step S4028 then stores the variance in forecast and actual sales by sales resource such that the manager can more easily remedy forecast problems at the individual sales representative or channel resource level.

Figure 16:
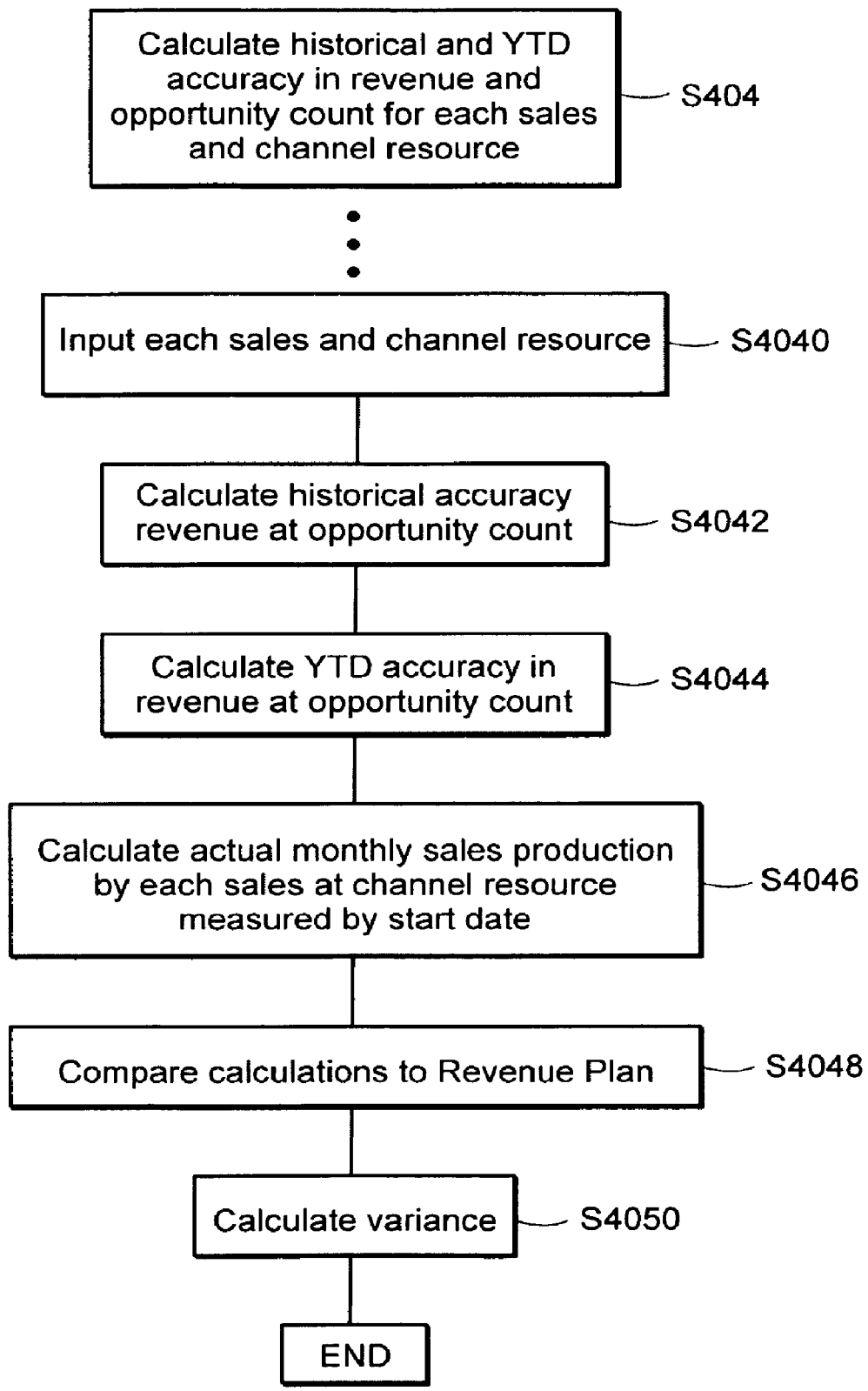
FIG. 16 is a flow chart depicting a method of managing forecast performance through historical data and year-to-date accuracy data with respect to revenue and opportunity count in accordance with the present invention.

FIG. 16 is a flow chart illustrating the particulars of step S404 in which the historical and YTD accuracy in revenue and opportunity count is calculated for each sales representative and channel resource. In step S4040, the method inputs each sales representative and channel resource. In step S4042, the method calculates the historical accuracy in revenue and opportunity count for each entered sales resource. In step S4044, the method calculates the YTD accuracy in revenue and opportunity count for each sales resource. In step S4046 the method calculates the actual monthly sales production for each sales representative and channel resource measured back to the start date of the respective sales resource. In step S4048, the foregoing calculations are compared to the seasonality curves that form part of the KPI. In step S4050, the variance between the seasonality curves and the historical and YTD forecast accuracy calculations are calculated according to the method.

In comparing the accuracy calculations to the seasonality curves, both monthly and quarterly, the method of the present invention helps a manager determine whether inaccurate forecasting is more related to the particular sales resource or more related to the seasonality of the sales cycle. In short, the comparison to the seasonality curves helps to "normalize" the accuracy of the foregoing calculations by eliminating a variable that is beyond the control of any sales resource.

Figure 17:
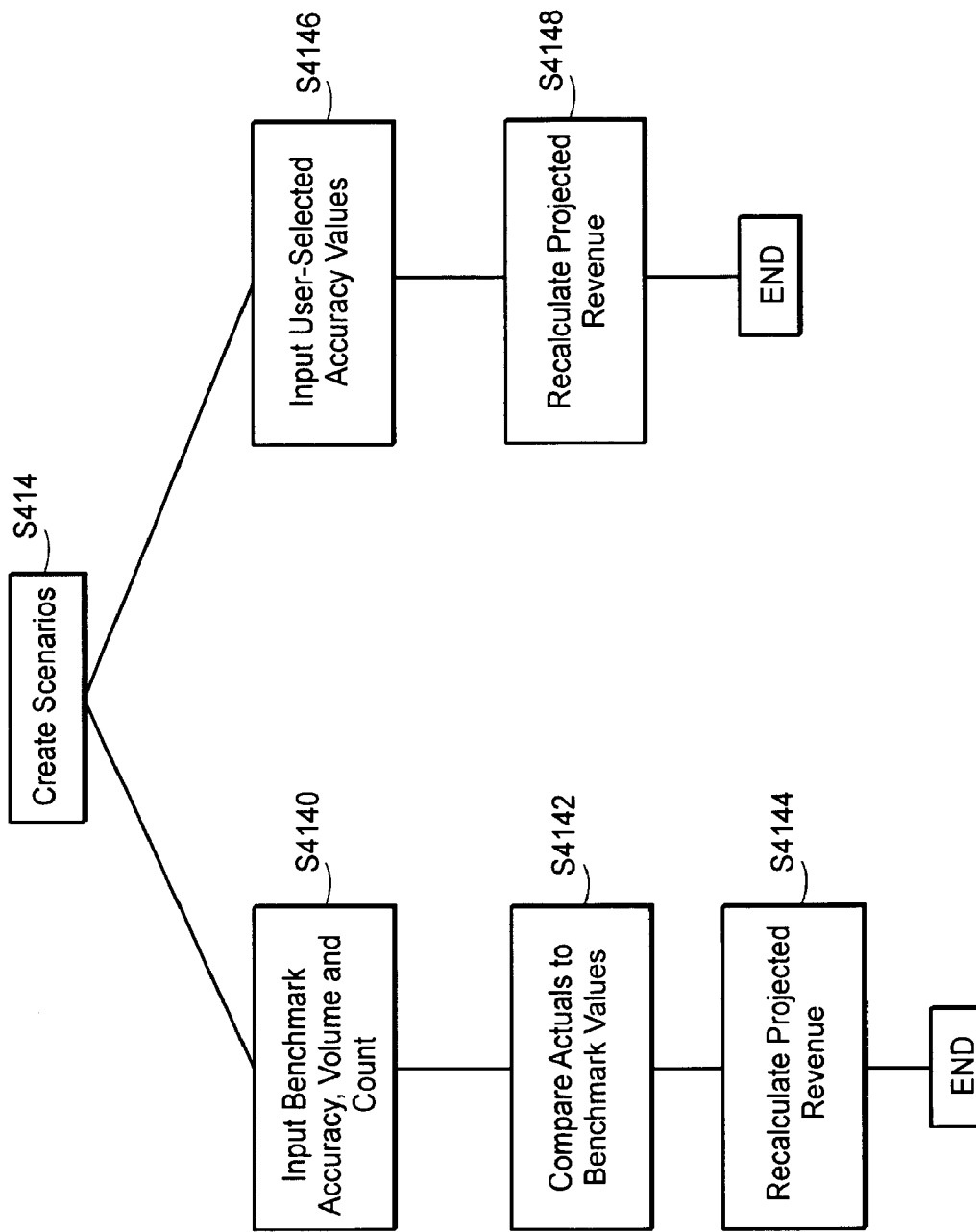
FIG. 17 is a flow chart depicting a method of managing forecast performance through the creation of scenarios in accordance with the present invention.

As previously noted, step S414 of the manage forecast performance routine 400 involves the creation of scenarios, shown in detail in FIG. 17. The create scenarios step S414 involves at least a pair of options for the user including creating a scenario based upon industry benchmarks and creating a scenario based on user inputs. In step S4140, the method inputs a set of industry benchmark data regarding forecast accuracy, opportunity volume and count. In step S4142, the method compares the actual values of these variables to the selected industry benchmark data. In step S4144, the method recalculates the projected revenue based upon the industry benchmark data to clearly illustrate the variance between the performances of the business to the rest of the industry, wherein the industry benchmark data is anonymously supplied by other users of the present invention as described above.

In step S4146, the user is permitted to input different accuracy values. The actual accuracy values were calculated in S402 and S404. These values were for historical forecast accuracy and activity and historical and YTD accuracy in revenue and opportunity count for each sales resource. Changes to any one of these values will result in a change in the projected revenue of the business, as calculated in step S4148.

Figure 18:
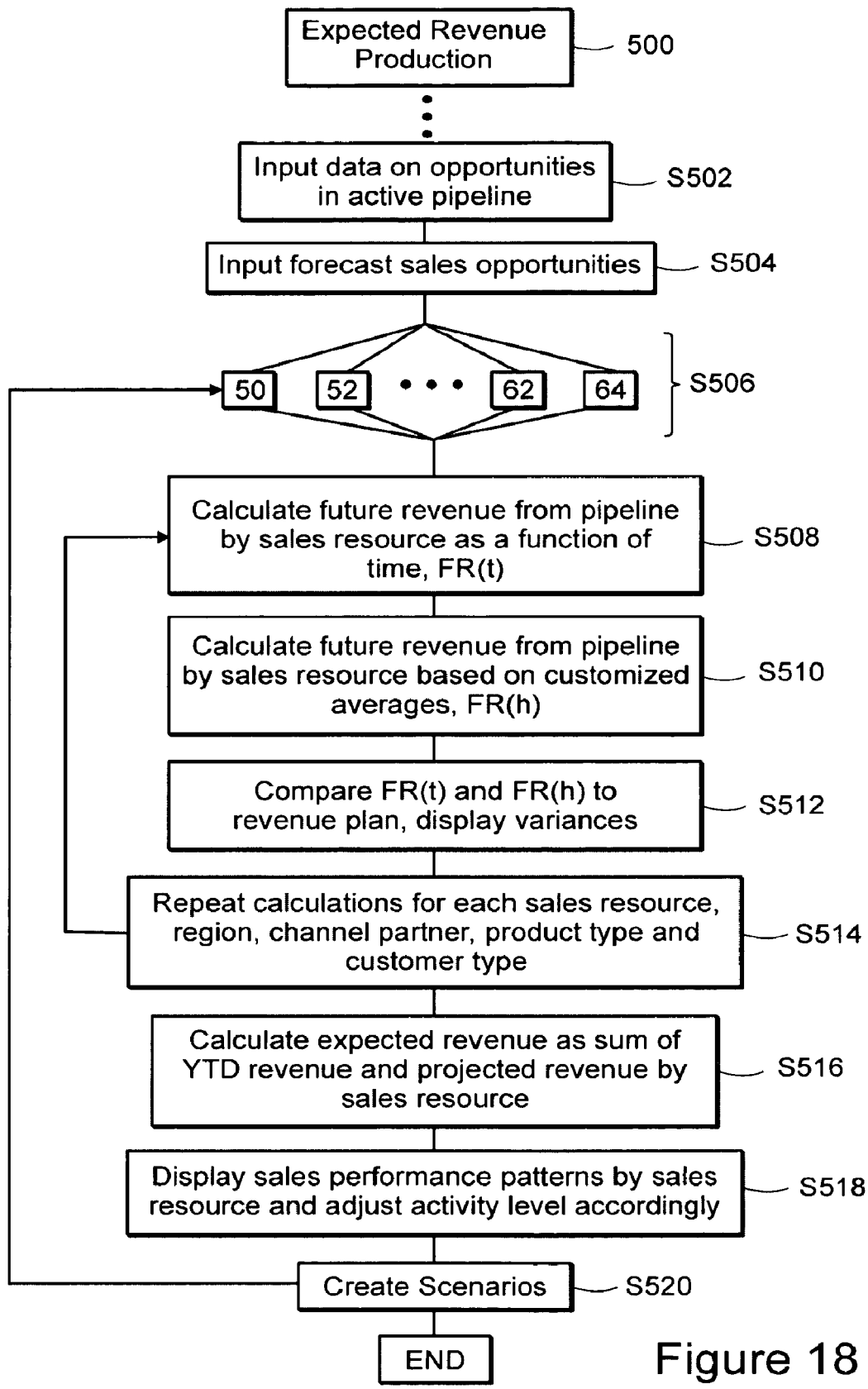
FIG. 18 is a flow chart depicting a method calculating expected revenue in accordance with the present invention.

FIG. 18 is a flow chart depicting a method of calculating expected revenue found in the expected revenue production routine 500 of the present invention. In step S502, the method inputs data related to opportunities in the active sales pipeline for each sales representative and channel resource. In step S504, the method inputs forecast sales opportunities for each sales representative and channel resource. In step S506, the method inputs the plurality of KPI described above with reference to FIG. 5.

In step S508, the method calculates the future revenue from the sales pipeline as a function of time, FR(t). In step S510, the future revenue is calculated from the sales pipeline as a function of historical averages, FR(h). In step S512, the variations between the FR(t) and FR(h) are calculated and shown to the user to better display potential problems with productivity or opportunity count for any particular sales resource. In step S514, the foregoing calculations are repeated for each sales representative, channel resource, geographical region, product type and customer type. At the conclusion of step S514, the manager will have an appreciation of the outputs of each and every sales resource across the range of the business, from which he or she can make adjustments to the sales practices in order to increase productivity or boost revenue.

In step S516, the method calculates the expected revenue for each sales representative and channel resource as a sum of the YTD revenue and the projected revenue as calculated above. In step S518, the method displays sales performance patterns for each sales resource, thus permitting the manager to adjust the activity level, i.e. number of opportunities, directed to or from a sales resource depending upon performance. In step S520, the user is permitted to create scenarios by making input adjustments to the KPI factors inputted at step S506. Thus, a manager can calculate the expected revenue by any particular sales resource by adjusting a productivity level, introducing a new hire, or removing a seasonality curve.

Figure 19:
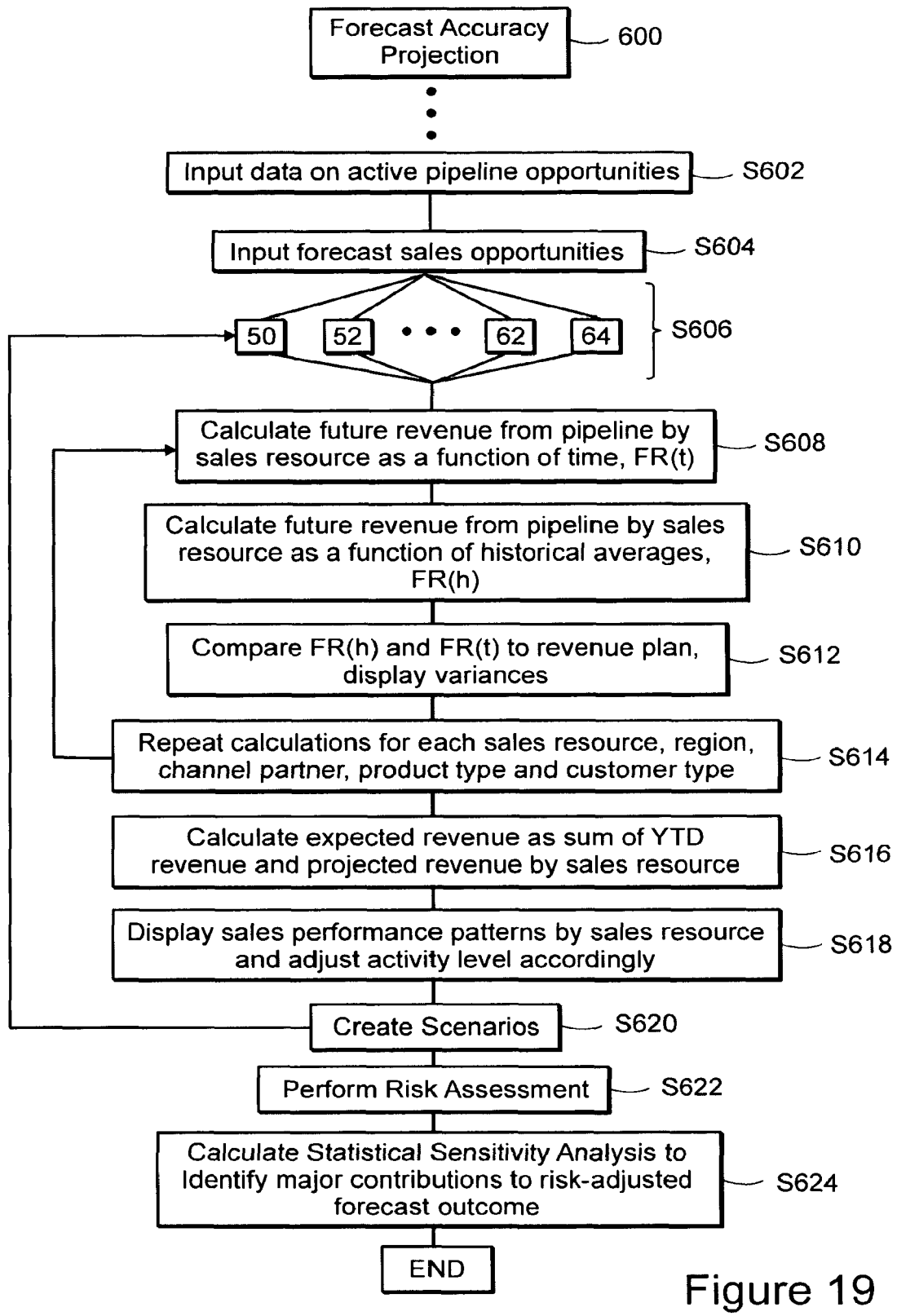
FIG. 19 is a flow chart depicting a method of determining forecast accuracy in accordance with the present invention.

A great deal of the foregoing methodology depends heavily on the accuracy of certain forecasts made by sales resources and managers. As such, the present invention includes a forecast accuracy projection routine 600 for monitoring and analyzing the accuracy and risks associated with business forecasting. The particulars of the forecast accuracy projection routine 600 are shown in the flow chart of FIG. 19.

In step S602, the method inputs data on active sales pipeline opportunities, and in step S604 the method inputs data on forecast sales opportunities. In step S606, the method inputs the plurality of KPI factors described in FIG. 5. In step S608, the method calculates the future revenue from the sales pipeline as a function of time, FR(t). In step S610, the future revenue is calculated from the sales pipeline as a function of historical averages, FR(h). In step S612, the variations between the FR(t) and FR(h) are calculated and shown to the user to better display potential problems with productivity or opportunity count for any particular sales resource. In step S614, the foregoing calculations are repeated for each sales representative, channel resource, geographical region, product type and customer type. As before, at the conclusion of step S614 the manager will have an appreciation of the outputs of each and every sales resource across the range of the business.

In step S616, the method calculates the expected revenue for each sales representative and channel resource as a sum of the YTD revenue and the projected revenue as calculated above. In step S618, the method displays sales performance patterns for each sales resource, thus permitting the manager to adjust the activity level, i.e. number of opportunities directed to or from a sales resource depending upon performance.

In step S620, the user is permitted to create scenarios by making input adjustments to the KPI factors inputted at step S606. As noted before, the manager can use the scenarios to calculate the expected revenue by any particular sales resource by adjusting a productivity level, introducing a new hire, or removing a seasonality curve. In step S622, the method performs a risk assessment described in greater detail with reference to FIG. 20. In step S624, the method calculates a statistical sensitivity analysis to identify major contributors to the risk-adjusted forecast outcome which permits the manager to better assess the volatility of making changes to hiring practices, resource allocation and the like.

Figure 20:
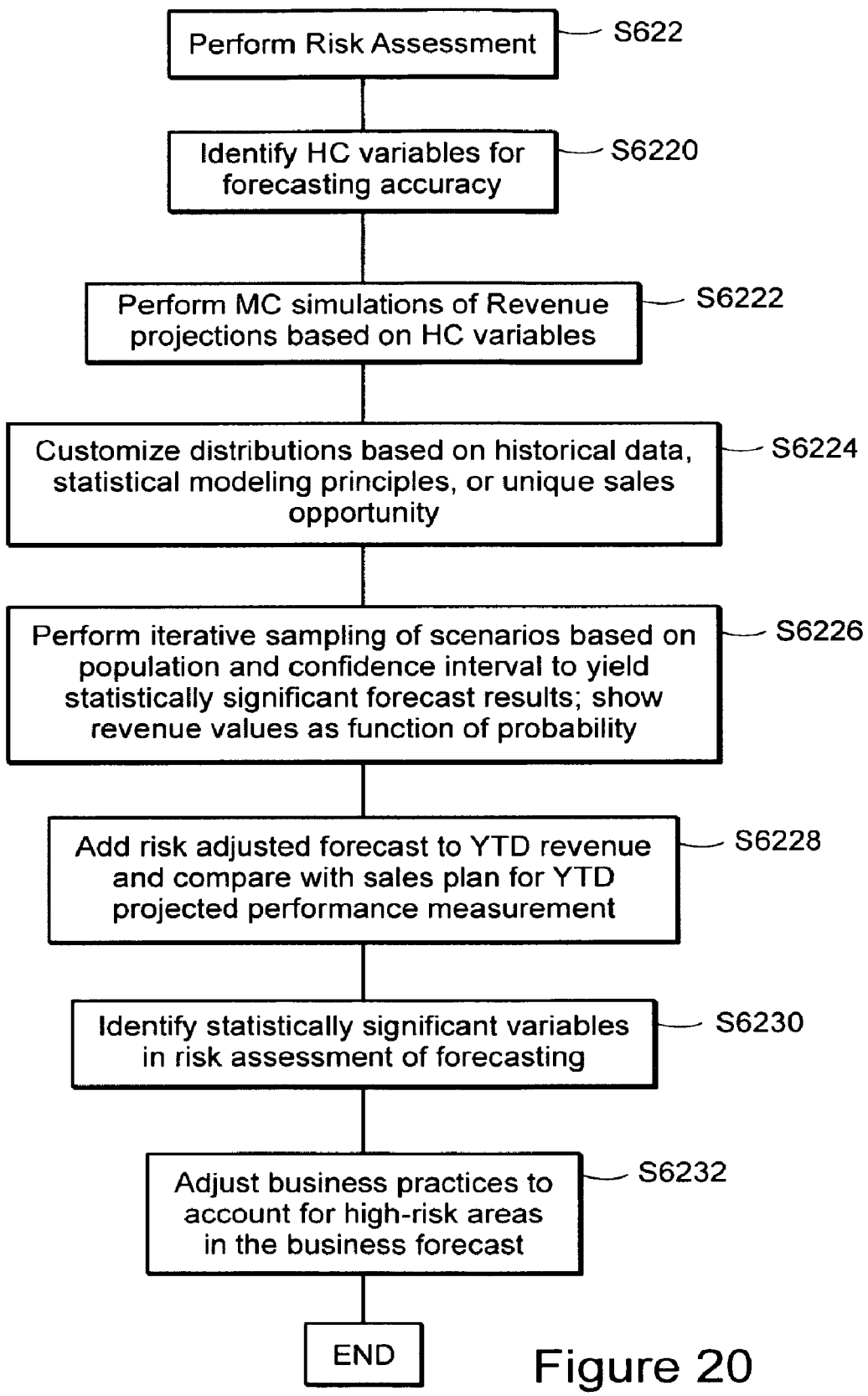
FIG. 20 is a flow chart depicting a method of analyzing risk associated with forecast projections in accordance with the present invention.

Turning now to FIG. 20, a flow chart depicting the risk assessment step S622 of the forecast accuracy projection routine is shown. In step S6220, the method identifies highly correlated variables for forecasting accuracy, such as for example quarterly seasonality 54 and monthly seasonality 60. In step S6222, the method performs a Monte Carlo or other statistical simulation of the revenue projections based upon statistical distributions of the highly correlated variables. In step S6224, the method permits a user to customize the statistical distribution based upon historical data, general statistical modeling principles or their understanding of unique sales opportunities. In step S6226, the method performs an iterative sampling of various scenarios using the highly correlated data set or user-set inputs. For example, a user may specify a desired probability for a sale rather than rely on the historical accuracy of the forecasts by a particular sales representative. Alternatively, the user may determine what revenue will be generated with a predetermined degree of certainty, i.e. what revenue will be generated with a 75% degree of certainty. The result is a set of statistically significant forecast results that allow the manager to see those variables and conditions that contribute to fluctuations in the revenue outcome. The output of step S6226 is a risk adjusted forecast.

In step S6228, the method adds the risk adjusted forecast to the YTD revenue to create a risk adjusted revenue projection. The method further compares this value to the sales plan for the YTD projected performance measurement, thus clarifying any potentially risky conditions for the manager. In step S6230, the method identifies any statistically significant variables in the risk assessment by finding those variables that result in the largest swings in projected revenue. In step S6232, the method informs the user of any statistically high-risk areas, in response to which the manager may adjust or adapt his or her business practices to account for the inherent risks in business forecasting.

Given the foregoing, it should be apparent to those skilled in the art that the present invention provides a novel and useful methodology for managing a business using selected data. In particular, the present invention utilizes a discrete set of data that can be input into an integrated planning, performance and forecasting system for managing virtually all aspects of a business. The present invention integrates historical data, projected data and forecasting data to constantly provide a user with current and accurate information and projections. As time passes and projected data becomes historical data, the present invention allows a user to seamlessly adjust the new revenue plans, hiring practices and forecasts. Of particular note is that the planning and forecasting aspects of the present invention allow users to more accurately assess the risks and benefits of certain business undertakings. These assurances result in a more professional corporate culture, which in turn makes the business a more sensible and reliable vehicle for all types of potential investors.

The present invention has been described with reference to the foregoing preferred embodiments. However, it should be understood that many trivial modifications to these embodiments could be readily devised by those skilled in the art without departing from the scope of the present invention as defined in the following claims.

We claim:

1. A method for calculating the volume of sales need to meet a revenue plan in real time comprising the steps of:
   providing a computer-executable program product comprising computer executable instructions tangibly embodied on a computer readable medium that when executed by a computer perform the method steps comprising:
   a) receiving a revenue plan for one or more of sales resources;
   b) receiving actual current sales activity data related to the one or more sales resources;
   c) calculating a sales activity plan needed to meet the revenue plan, wherein calculating the sales activity plan comprises the steps of:
      i) calculating projected revenue for the one or more sales resources over for a period of time,
      ii) adjusting the calculated projected revenue based on expected attrition and addition of one or more of the one or more sales resources for the period of time; and
      iii) determining the volume of sales needed to achieve the revenue plan received at step a); and
   d) calculating a projected expenses plan associated with the one or more sales resources;
   e) calculating a revised revenue plan based on the calculated sales activity plan and projected expenses plan;
   f) calculating a risk assessment value determinative of the likelihood that the one or more sales resources will fulfill the revised revenue plan;
   g) repeating steps a) through f) wherein the calculated revised revenue plan becomes the revenue plan input at step a); and
   h) outputting on a user display in communication with the computer a comparison of current sales activity against the projected revenue plan for the one or more sales resources and the calculated risk assessment value.

2. The method of claim 1 wherein calculating projected revenue for the one or more sales resources over for a period of time includes analyzing information related to a current sales performance data, a sales hiring data, an active sales opportunities data, a past sales opportunities data, and a past sales performance data.

3. The method of claim 1 further comprising a step between steps e) and f) of simulating benchmark scenarios for the revenue plan using industry benchmark data, wherein the industry benchmark data includes a current sales performance data, a sales hiring data, an active sales opportunities data, a past sales opportunities data, a past sales performance data, a corporate expense data, a sales expense data and a customer purchase history data.

4. The method of claim 1 further comprising a step after step a) and before step g) of inputting a plurality of key performance indicators.

5. The method of claim 4 wherein the plurality of key performance indicators are average sales representative production, sales resource attrition rate, quarterly seasonality, average sales cycle yield by step, average new hire productivity curve, monthly seasonality, average transaction size and average sales cycle length by step.

6. The method of claim 1 wherein step c), the step of calculating the sales activity needed to meet the revenue plan further comprises:
receiving data related to the average sales cycle yield;
receiving data related to the average sales cycle length;
receiving data related to the average transaction amount;
receiving data related to the revenue calculated by the revenue plan; and
calculating the number of sales opportunities required to generate the revenue calculated by the revenue plan.

7. The method of claim 1 wherein step e) further comprises:
receiving data into the computer on sales opportunities in active pipelines;
receiving data related to forecast sales opportunities;
receiving data related to a plurality of key performance indicators;
calculating an expected future revenue as a function of time, FR (t);
calculating an expected future revenue as a function of historical averages FR (h); and
calculating an expected revenue production as a function of year-to-date revenue and projected revenue by each of the plurality of sales resources.

8. The method of claim 7 further including the step of creating scenarios for adjusting the calculated expected revenue production based upon changes to the actual current sales activity data and the key performance indicators for each of the one or more sales resources.

9. The method of claim 1 wherein the step of calculating a risk assessment includes:
identifying a set of correlated variables for forecasting accuracy;
performing a Monte Carlo simulation of revenue production based upon changes to the set of correlated variables;
adding a risk-adjusted forecast to year-to-date revenue to produce a sum; and
comparing the sum to a revenue plan for a year-to-date projected performance measurement; and
identifying a set of risk variables based upon the year-to-date projected performance measurement.

* * * * *